United States Patent
Van Der Veen et al.

(10) Patent No.: US 12,494,247 B2
(45) Date of Patent: Dec. 9, 2025

(54) DYNAMIC ROWHAMMER MANAGEMENT WITH PER-ROW HAMMER TRACKING

(71) Applicant: QUALCOMM INCORPORATED, San Diego, CA (US)

(72) Inventors: Victor Van Der Veen, Leusden (NL); David Hartley, Berlin (DE)

(73) Assignee: Qualcomm Incorporated, San Diego, CA (US)

( * ) Notice: Subject to any disclaimer, the term of this patent is extended or adjusted under 35 U.S.C. 154(b) by 243 days.

(21) Appl. No.: 18/184,602

(22) Filed: Mar. 15, 2023

(65) Prior Publication Data

US 2024/0312508 A1   Sep. 19, 2024

(51) Int. Cl.
G11C 11/406   (2006.01)
G11C 11/4078   (2006.01)

(52) U.S. Cl.
CPC .. *G11C 11/40618* (2013.01); *G11C 11/40615* (2013.01); *G11C 11/4078* (2013.01)

(58) Field of Classification Search
CPC ........ G11C 11/40618; G11C 11/40615; G11C 11/4078; G11C 2211/4065; G11C 11/40622; G11C 11/40611
See application file for complete search history.

(56) References Cited

U.S. PATENT DOCUMENTS

| | | |
|---|---|---|
| 2019/0066808 A1 | 2/2019 | Nale |
| 2020/0381040 A1* | 12/2020 | Penney ............... G11C 11/4085 |
| 2022/0199144 A1* | 6/2022 | Roberts ............... G11C 11/4078 |
| 2022/0415384 A1 | 12/2022 | SeyedzadehDelcheh et al. |

FOREIGN PATENT DOCUMENTS

EP   4138078   2/2023

OTHER PUBLICATIONS

W. Kim et al., "A 1.1V 16Gb DDR5 DRAM with Probabilistic-Aggressor Tracking, Refresh-Management Functionality, Per-Row Hammer Tracking, a Multi-Step Precharge, and Core-Bias Modulation for Security and Reliability Enhancement," 2023 IEEE International Solid-State Circuits Conference (ISSCC), (Year: 2023).*

(Continued)

*Primary Examiner* — Alexander Sofocleous
*Assistant Examiner* — James S Wells
(74) *Attorney, Agent, or Firm* — Smith, Tempel, Blaha LLC

(57) ABSTRACT

Managing row hammering in a DRAM device may include maintaining per-row activation command counts. A next aggressor row may be determined based on the counts. A victim queue may be maintained. A refresh operation may be directed to a row indicated by the victim queue when conditions include that the victim queue is not empty when the refresh command is received. The current aggressor row may be updated with the next aggressor row when conditions include that the victim queue is empty when the refresh command is received. Following updating the current aggressor row, the count of the next aggressor row may be updated. A victim row corresponding to the current aggressor row may be added to the victim queue if the victim queue is empty when the refresh command is received.

14 Claims, 22 Drawing Sheets

(56) References Cited

OTHER PUBLICATIONS

J. S. Kim et al., "Revisiting RowHammer: An Experimental Analysis of Modern DRAM Devices and Mitigation Techniques," 2020 ACM/IEEE 47th Annual International Symposium on Computer Architecture (ISCA), Valencia, Spain, 2020, pp. 638-651 (Year: 2020).*

Related PCT Pat. App. Ser. No. PCT/US24/013400, filed on Jan. 29, 2024, entitled, "Dynamic Rowhammer Management With Per-Row Hammer Tracking," International Search Report (ISR) and Written Opinion (EPO) dated May 22, 2024.

* cited by examiner

702

| | Bucket ACT Count Threshold | Bucket R_Threshold | Row Count |
|---|---|---|---|
| | >=0 | N/A | 65536 |
| 1st usable bucket | >=100 | 300 | 0 |
| 2nd usable bucket | >=250 | 200 | 0 |
| 3rd usable bucket | >=500 | 100 | 0 |

704

| | Bucket ACT Count Threshold | Bucket R_Threshold | Row Count |
|---|---|---|---|
| | >=0 | N/A | 65536 |
| 1st usable bucket | >=100 | 300 | 6224 |
| 2nd usable bucket | >=250 | 200 | 0 |
| 3rd usable bucket | >=500 | 100 | 0 |

706

| | Bucket ACT Count Threshold | Bucket R_Threshold | Row Count |
|---|---|---|---|
| | >=0 | N/A | 65536 |
| 1st usable bucket | >=100 | 300 | 6224 |
| 2nd usable bucket | >=250 | 200 | 554 |
| 3rd usable bucket | >=500 | 100 | 29 |

| Row | T1 Initial count | T2 Refresh | Count | T3 Attack window | Count | T4 Refresh | Count | T5 Attack window | Count | T6 Refresh | Count |
|---|---|---|---|---|---|---|---|---|---|---|---|
| 1 | 1000 | receives REF | 1 | 500 ACTs | 1 | receives REF | 1 | 250 ACTs | 1 | | 1 |
| 2 | 1000 | scheduled next (at T4) | 1000 | | 500 | scheduled next (at T6) | 500 | 250 ACTs | 750 | | 750 |
| 3 | 1000 | scheduled for T6 | 1000 | | 1000 | | 1000 | | 1250 | receives REF | 250 |

FIG. 20

DYNAMIC ROWHAMMER MANAGEMENT WITH PER-ROW HAMMER TRACKING

DESCRIPTION OF THE RELATED ART

Dynamic random access memory ("DRAM") may be included in a wide variety of computing devices. Maintaining data integrity in DRAM is an important consideration.

It has been observed that repeatedly activating one or more rows of a DRAM array within a single refresh window may compromise data integrity, i.e., may result in corruption of stored data. Repeatedly activating one or more rows of a DRAM array may cause one or more cells of a physically proximate row to leak its stored electrical charge, resulting in an increased probability of a bit flip. This phenomenon is commonly referred to as "row hammering" or "rowhammer," and may be exploited by an attacker to intentionally corrupt stored data.

A number of rowhammer mitigation methods have been developed. Some rowhammer mitigation methods may throttle or limit row activation rates when rapid row activations are detected. Other rowhammer mitigation methods may refresh potential victim rows when rapid row activations are detected. Rowhammer mitigation methods may count the number of row activations occurring within a refresh window. A threshold number of row activations, above which the probability of a bit flip is deemed unacceptably high, may be determined, and mitigation may be applied when the count of row activations reaches the threshold. It would be desirable to improve the mitigation or management of the rowhammer phenomenon.

SUMMARY OF THE DISCLOSURE

Systems, methods, and other examples are disclosed for tracking and mitigating row hammering in a dynamic random access memory (DRAM) system.

An exemplary method in a DRAM device may include counting the number of row activation commands directed to each row of a bank of the DRAM device. The method may also include determining a next aggressor row, based on the number of row activation commands. The method may further include updating a current aggressor row with the next aggressor row based on detection of a refresh command directed to the bank. The method may also include, following updating the current aggressor row, resetting a count of the number of row activation commands directed to the next aggressor row.

An exemplary system in a DRAM device may include aggressor processing circuitry and mitigation processing circuitry. The aggressor processing circuitry may be configured to count the number of row activation commands directed to each row of a bank of the DRAM device and to determine a next aggressor row based on the number of row activation commands. The mitigation processing circuitry may be configured to, based on detection of a refresh command directed to the bank, determine whether a victim queue is empty, and initiate refreshing a row in the victim queue based on detection of a refresh command directed to the bank and a determination the victim queue is not empty. The mitigation processing circuitry may also be configured to update a current aggressor row with the next aggressor row based on detection of a refresh command directed to the bank.

Another exemplary system in a DRAM device may include means for counting the number of row activation commands directed to each row of a bank of the DRAM device. The system may also include means for determining a next aggressor row based on the number of row activation commands. The system may further include means for updating a current aggressor row with the next aggressor row based on detection of a refresh command directed to the bank. The system may also include, following updating the current aggressor row, resetting a count of the number of row activation commands directed to the next aggressor row.

An exemplary DRAM device may include at least one data storage array, refresh processing circuitry, and row hammering processing circuitry. The refresh processing circuitry may be configured to direct refresh operations to rows of the data storage array. The row hammering processing circuitry may include aggressor processing circuitry and mitigation processing circuitry. The aggressor processing circuitry may be configured to count the number of row activation commands directed to each row of a bank of the DRAM device and to determine a next aggressor row based on the number of row activation commands. The mitigation processing circuitry may be further configured to update a current aggressor row with the next aggressor row based on detection of a refresh command directed to the bank. The aggressor processing circuitry may be further configured to reset, following the updating of the current aggressor row, a count of the number of row activation commands directed to the next aggressor row.

BRIEF DESCRIPTION OF THE DRAWINGS

In the Figures ("FIGs."), like reference numerals refer to like parts throughout the various views unless otherwise indicated. For reference numerals with letter character designations such as "101A" or "101B," the letter character designations may differentiate two like parts or elements present in the same Figure. Letter character designations for reference numerals may be omitted when it is intended that a reference numeral to encompass all parts having the same reference numeral in all Figures.

FIG. 20 is a timing chart illustrating an example of operation of the method of FIGS. 18-19, in accordance with exemplary embodiments.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
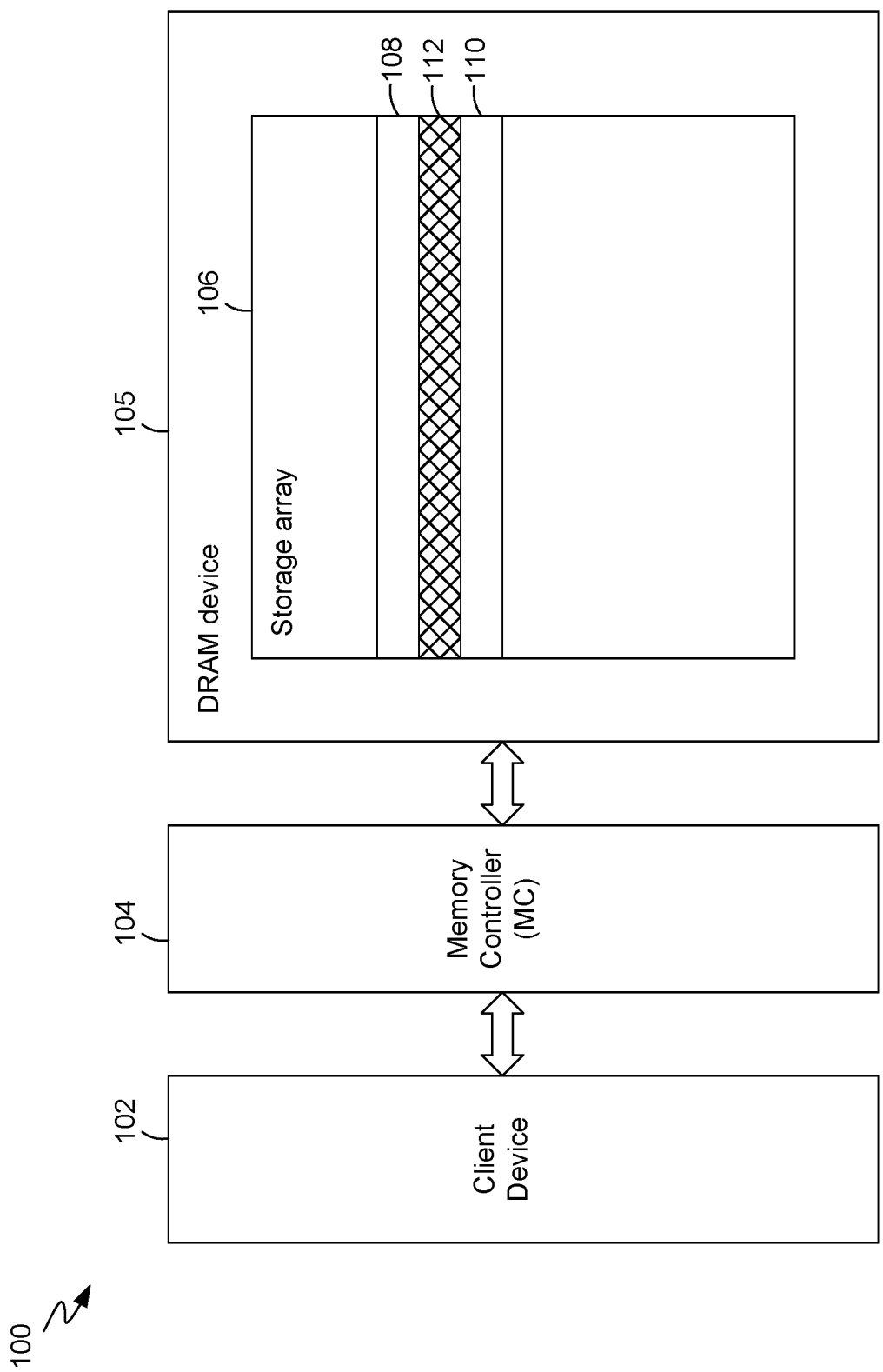
FIG. 1 is a block diagram of a DRAM system and a client device, in accordance with exemplary embodiments.

As shown in FIG. 1, in an illustrative or exemplary embodiment a system 100 may include a client device 102, a memory controller 104, and a dynamic random access memory ("DRAM") device 105 having one or more storage arrays 106. As described below, the memory controller 104 and the DRAM device 105, may together include features for mitigating the effects of the phenomenon commonly known as "row hammering" or "rowhammer." The DRAM device 105 may include various features relating to dynamically tracking row hammering on a per-row basis.

Rowhammer is a disturbance error that may result in corruption of data stored in the storage array 106. Repeatedly activating one or more rows 108, 110, etc., may cause the stored electrical charge in a cell (not individually shown in FIG. 1) of another row 112 that is physically proximate to those one or more rows 108, 110, etc., to leak that charge, increasing the probability of a bit flip. That is, as a result of a rowhammer attack, there may be an increased probability that a bit value read from a cell is different from the bit value that was originally stored in the cell. More specifically, a "1" that was stored before the rowhammer attack may be erroneously read as a "0" after the rowhammer attack, or a "0" that was stored before the rowhammer attack may be erroneously read as a "1" after the rowhammer attack. The rows 108, 110, etc., may be referred to as "aggressor" rows, and the row 112 (indicated in cross-hatch in FIG. 1 for emphasis) may be referred to as a "victim" row. In the illustrated example, the victim row 112 is immediately adjacent each of the aggressor rows 108 and 110. In other examples of rowhammer attacks, such a victim row may be adjacent to only one aggressor row. Although only three rows 108, 110 and 112 are shown for purposes of example, the storage array 106 may have any number of rows, such as, for example, 16 k, 32 k, etc., as understood by one of ordinary skill in the art.

Figure 2:
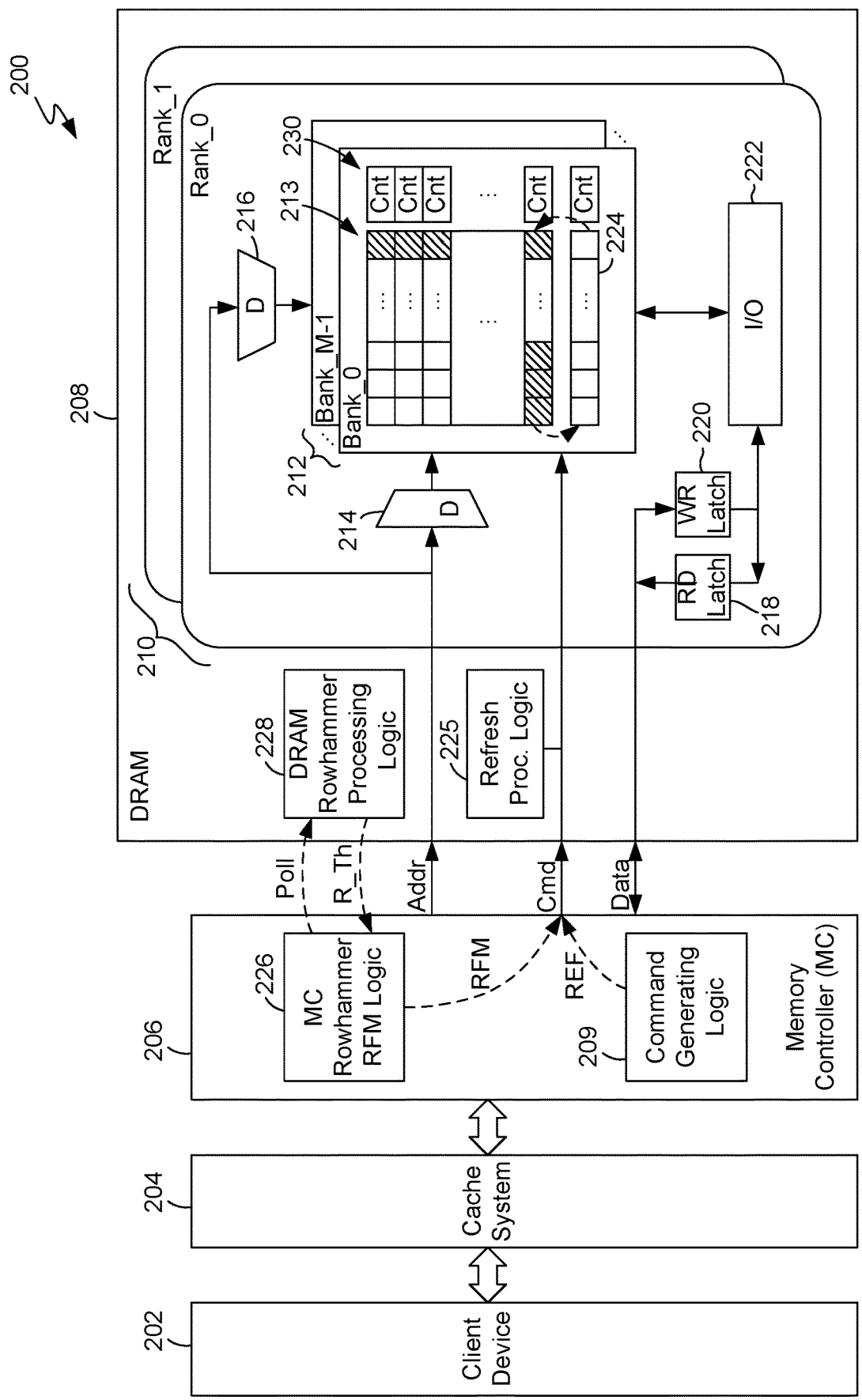
FIG. 2 is a block diagram similar to FIG. 1, showing memory controller and DRAM features for rowhammer tracking and mitigation, in accordance with exemplary embodiments.

As illustrated in FIG. 2, a system 200 may include a client device 202, a cache system 204, a memory controller 206, and a DRAM device 208. Some or all of these elements may be included in a "system-on-a-chip" or "SoC" that includes one or more types of processors, such as central processing units ("CPU"s), graphics processing units ("GPU"s), digital signal processors ("DSP"s), neural processing units ("NPU"s), etc. The client device 202 may, for example, be implemented in a CPU (not separately shown) or application processor. Although not shown in FIG. 2 for purposes of clarity, the system 200 may be included in a computing device, such as, for example, a portable computing device. The system 200 may be an example of the above-described system 100 (FIG. 1).

The client device 202 may issue DRAM transaction requests that may include read requests, i.e., requests to read data from the DRAM device 208, and write requests, i.e., requests to store data in the DRAM device 208. The DRAM transaction requests may also be referred to as requests to access the DRAM device 208. Each DRAM transaction request may include a target address in the DRAM device 208, a size or amount of data to be accessed, and other information. A write request also includes the data, which may be referred to as a payload, that the memory controller 206 is to store in the DRAM device 208 in response to the write request.

But for the features described herein with regard to rowhammer mitigation, the structure and operation of the memory controller 206 and DRAM device 208 are well understood by one of ordinary skill in the art. Nevertheless, the following brief description is provided as background.

The memory controller 206 may include command generating circuitry or logic 209 configured to translate the transaction requests into DRAM commands ("Cmd") and physical DRAM addresses ("Addr") and provide the commands and addresses to the DRAM device 208. In addition to producing commands in response to transaction requests, the command generating circuitry/logic 209 may produce periodic refresh commands ("REF") that the DRAM device 208 needs to receive to retain stored data. The memory controller 206 may queue the transaction requests and, using a scheduling algorithm, provide the associated commands and addresses to the DRAM device 208 in a determined order. In providing the commands and addresses to the DRAM device 208, the memory controller 206 may control the timing of such commands and addresses with respect to one another. As such aspects are well understood by one of ordinary skill in the art, they are not described in further detail herein. The memory controller 206 may include various other logic blocks or elements that are well understood by one of ordinary skill in the art, such as scheduling logic configured to perform the above-referenced scheduling, arbitration logic configured to control the order of the commands as they are conveyed through the memory controller 206 to the DRAM device 208, etc., and such elements are not shown in FIG. 2 for purposes of clarity.

The DRAM device 208 may be of any type not inconsistent with the descriptions herein. For example, the DRAM device 208 may be a double data rate synchronous DRAM ("DDR-SDRAM"), sometimes referred to for brevity as "DDR." As DDR technology has evolved, DDR versions such as fourth generation low-power DDR ("LPDDR4") and fifth generation low-power DDR ("LPDDR5") have been developed. The DRAM device 208 may comprise, for example, LPDDR4, LPDDR4X, LPDDR5, LPDDR5X, etc. Still other types of DDR include graphics DDR ("GDDR"). Although the DRAM device 208 may be DDR in the examples described herein, in other examples such a DRAM could be another type of low power DRAM, such as the SDRAM in a High Bandwidth Memory ("HBM").

The DRAM device 208 may comprise two ranks 210, which may be referred to as Rank_0 and Rank_1. Although two ranks 210 are shown in this example, in other examples there may be only one rank or more than two ranks. As the two ranks 210 are identical to each other, the following description applies to each rank 210. A rank 210 comprises two or more ("M") banks 212, which may be referred to as Bank_0 through Bank_M−1. Each bank 212 is organized as a two-dimensional storage array 213 of cells or storage locations, where the storage locations in the storage array 213 are accessed by selecting rows and columns. A cell's electrical charge represents a stored data value, i.e., a "1" or a "0". The storage array 213 may be an example of the storage array 106 shown in a more conceptual form in FIG. 1. The storage array 213 may have any number of rows, such as, for example, 16 k, 32 k, etc.

An exemplary row and an exemplary column of a storage array 213 are highlighted in cross-hatch in FIG. 2 for purposes of illustration. A row may also be referred to as a wordline in some examples. Also, although not illustrated in FIG. 2 for purposes of clarity, the DRAM device 208 may further be organized in bank groups. For example, each rank 210 may consist of four bank groups (not shown), and each of those bank groups may consist of four banks. In such an example the DRAM device 208 therefore consists of 32 distinct (i.e., individually addressable) banks 212. Although in the example illustrated in FIG. 2 the DRAM device 208 has two ranks 210, each having four bank groups, and each of the four bank groups has four banks 212, in other examples such a DRAM may be organized in any other way, including more or fewer ranks, banks, bank groups, etc., than in the illustrated example.

The physical addresses by which the memory controller 206 accesses the DRAM device 208 may include row addresses, column addresses, bank group addresses, and bank addresses. Also, although not shown for purposes of clarity, in response to a rank address (e.g., a chip select bit included in the read or write command) provided by the memory controller 206, rank address decoding logic may select one of the ranks 210. Although likewise not shown for purposes of clarity, in response to a bank address provided by the memory controller 206, bank address decoding logic may select one of the banks 212 in a selected bank group of a selected rank 210. In response to a row address provided by the memory controller 206, a row address decoder 214 may select one of the rows in a selected bank 212 of a selected bank group in a selected rank 210. Similarly, in response to a column address provided by the memory controller 206, a column address decoder 216 may select one of the columns in a selected bank 212 of a selected bank group in a selected rank 210. Sequential row addresses may correspond to sequential row physical locations. That is, a row having an address X+1 may be physically adjacent to a row having an address X, and a row having an address X−1 may similarly be physically adjacent to the row having the address X. In the example described above with regard to FIG. 1, the victim row 112 may have the address X, and the aggressor rows 108 and 110 may have the addresses X+1 and X−1. Sequential row addresses do not necessarily correspond to sequential row physical locations in all DRAMs, but such an example is shown in FIG. 1 to more clearly illustrate the rowhammer principle.

Each rank 210 may have a read latch 218 to buffer the read data, and a write latch 220 to buffer the write data. Each rank 210 may also have input/output ("I/O") logic 222 configured to direct the read and write data from and to selected memory locations.

Each bank 212 may have a row buffer 224. The row buffer 224 stores the contents of the selected row. A row must be selected or "opened" before it may be written to or read from. The DRAM device 208 opens a row, i.e., stores the contents of that row in the row buffer 224, in response to an activate ("ACT") command. Once a row is opened, the DRAM device 208 may read from or write to any number of columns in the row buffer 224 in response to read or write commands, also referred to as column address select ("CAS") commands. Following a read or write command, the data is transferred serially between the memory controller 206 and DRAM device 208 in units known as a "burst," which may be, for example, eight bits per data signal line. The row must be restored or "closed" after writing to or reading from the row buffer 224. The DRAM device 208 closes a row in response to a pre-charge ("PRE") command. Storage logic configured to act upon the storage arrays 213, latches 218 and 220, I/O logic 222, etc., in the manner described above in response to the row activation, refresh and other DRAM commands is also included in the DRAM device 208 but is not shown for purposes of clarity in FIG. 2.

In translating a read request or write request, the command generating circuitry/logic 209 may determine commands needed to fulfill the request, and scheduling and arbitration logic (not shown) may determine a sequence and timing of the commands as they are sent from the memory controller 206 to the DRAM device 208.

A "refresh window" refers to a fixed amount of time ("tREFW") within which all rows of a bank 212 must receive refresh operations to maintain data integrity. Within each refresh window, a fixed number of refresh operations, such as, for example, 8192 (i.e., 8 k) REF operations, must be performed to refresh all rows of the bank 212. That is, in such an example all rows in a bank 212 have been refreshed after 8192 REF operations have been performed. The refresh window may be referred to as a sliding window because while its length, tREFW, is fixed, the refresh window may occur at any time with respect to other DRAM-related signals.

The command generating circuitry/logic 209 may generate refresh commands to perform periodic refresh operations to maintain data integrity. A command associated with such a periodic refresh operation may be referred to as a per-bank refresh ("REF" or "Ref") command. A per-bank refresh command is directed to a particular or selected bank (rather than all banks). The DRAM device 208 may include refresh processing circuitry or logic 225. The refresh processing circuitry/logic 225 may be configured to, among other functions, direct periodic refresh operations to the DRAM storage arrays in response to periodic refresh commands ("REF") received from the memory controller 206.

As noted above, within each refresh window there may be a threshold number of activations of an aggressor row above which the probability of a bit flip in a victim row is deemed unacceptably high. This threshold number of activations may be determined empirically and may vary depending upon factors such as the physical distance between adjacent rows, semiconductor process variation, temperature, etc. Similarly, a Maximum Activation Count ("MAC_bank") of a given bank 212 may be determined. MAC_bank is a threshold number of same-bank same-row activations above which the probability of a bit flip in a victim row of that bank exceeds a threshold. The probability of a bit flip will not exceed this probability threshold so long as fewer than MAC_bank+1 same-row activations occur within the sliding refresh window (i.e., within tREFW). Stated conversely, the probability of a bit flip will exceed this threshold when an (MAC_bank+1)th same-row activation occurs within tREFW.

In addition to the features of the system 200 that are described above for background purposes, rowhammer mitigation features may be included in the system 200. In accordance with one aspect of exemplary rowhammer mitigation features, memory controller rowhammer mitigative refresh ("RFM") circuitry/logic 226 may be included in the memory controller 206. In accordance with another aspect of exemplary rowhammer mitigation features, DRAM rowhammer mitigation processing circuitry/logic 228 may be included the DRAM device 208.

Each bank 212 may also include per-row hammer tracking ("PRHT") counters ("Cnt") 230. Each of the PRHT counters 230 may correspond to one of the rows of the array 213 and may maintain a count of the number of row activation commands directed to that row. For example, each PRHT counter 230 may be configured to increment its activation command count in response to detecting a row activation command directed to that row. Each PRHT counter 230 also may be configured to reset its activation command count to zero in response to a request or signal from the DRAM rowhammer mitigation processing circuitry/logic 228. Signal connections from the DRAM rowhammer mitigation processing circuitry/logic 228 to the PRHT counters 230 are not shown for purposes of clarity but may be included to enable the DRAM rowhammer mitigation processing circuitry/logic 228 to reset any selected one or more of the PRHT counters 230.

The term "circuitry/logic" as used herein refers to electronic circuitry (i.e., hardware), which may include such elements as discrete logic gates, finite state machines, flip-flops, registers, memory elements, processors, etc., or combinations thereof. In some examples, circuitry/logic may be configured in part by operation of firmware or software. For convenience, such circuitry/logic may be referred to as circuitry or, alternatively, as logic.

In accordance with one aspect of exemplary rowhammer mitigation systems and methods, the memory controller rowhammer mitigative refresh logic 226 may receive from the DRAM rowhammer mitigation processing logic 228 a per-bank activation count threshold value, referred to herein as R_Threshold (or R_Th). R_Threshold represents a current or dynamic estimate by the DRAM device 208 of the number of row activations above which the probability of a bit flip may exceed threshold level of probability. The rowhammer mitigative refresh logic 226 may count the number of per-bank row activation commands, and send an additional or mitigative refresh command to the DRAM device 208 when the counted number of per-bank row activation commands exceeds R_Threshold.

Broadly, the DRAM device 208 may determine R_Threshold in any manner. Nevertheless, exemplary methods by which the DRAM device 208 may determine or select R_Threshold may be described herein in accordance with other aspects of exemplary rowhammer mitigation systems and methods.

Figure 3:
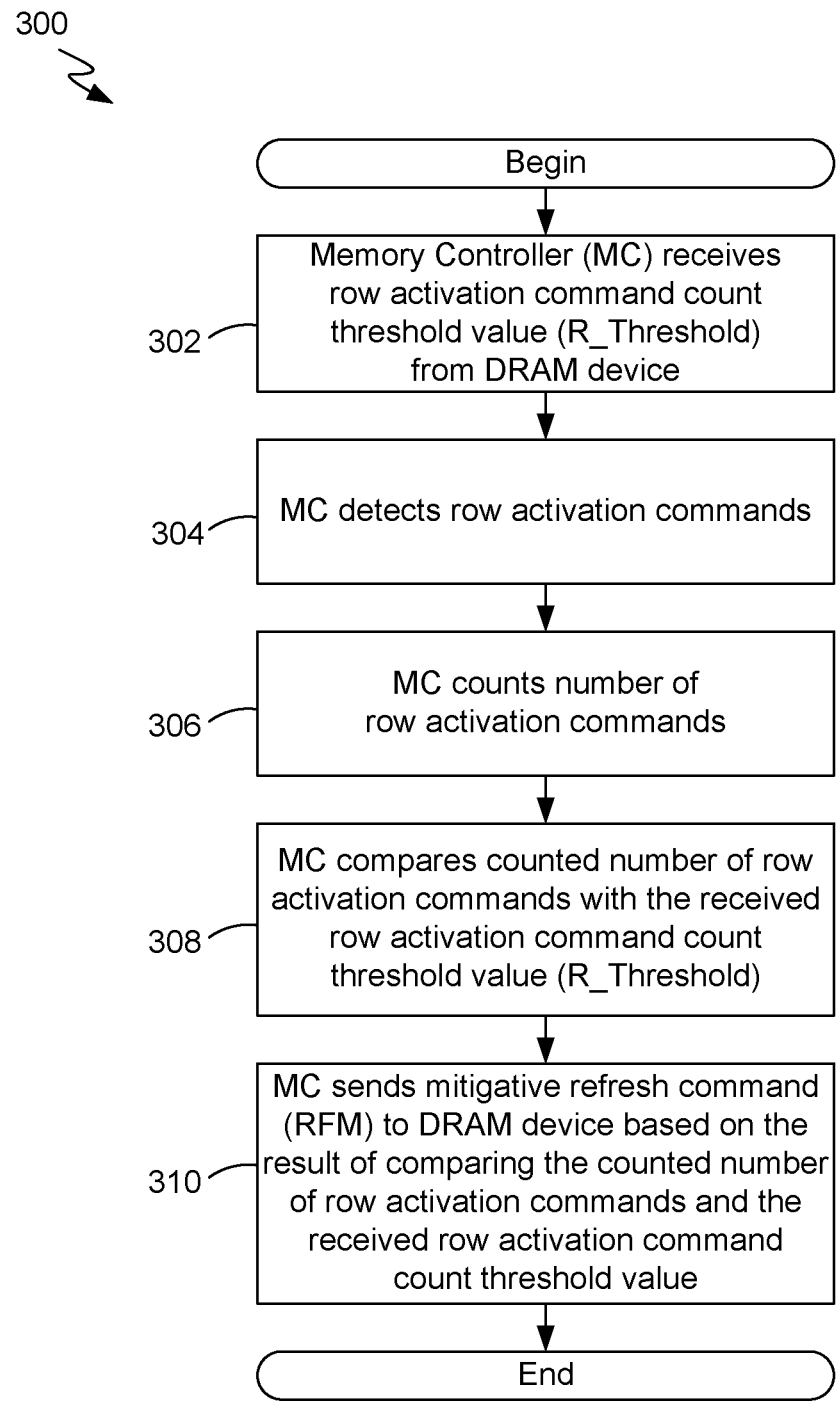
FIG. 3 is a flow diagram illustrating a method for rowhammer mitigation, in accordance with exemplary embodiments.

In FIG. 3 a method 300 is illustrated in flow diagram form. As indicated by block 302, the method 300 may include the memory controller receiving an activation count threshold value (R_Threshold) from the DRAM device. For example, the memory controller may receive the activation count threshold value in response to polling the DRAM device. In some examples, the activation count threshold value may be a per-bank activation count threshold value. As noted above, "per-bank" refers to only one of the banks, as opposed to multiple banks collectively. It is contemplated that in some examples of the systems and methods described herein different (per-bank) activation command threshold values could be established for different banks.

As indicated by block 304, the method 300 may further include the memory controller detecting the row activation commands. A row activation command may be a per-bank row activation command, i.e., directed to a row in a particular one of the banks. As indicated by block 306, the method 300 may also include the memory controller counting the number of detected row activation commands. The counted number of row activations (which may also be referred to as an activation command count) may be per-bank. That is, each time an activation command directed to any row in the bank is detected, the row activation command count for that bank may be incremented. It should be noted that while the memory controller may maintain such a per-bank row activation command count, the DRAM device may maintain (not shown in FIG. 3) per-row activation command counts, as described below.

As indicated by block 308, the method 300 may still further include comparing, by the memory controller, the row activation command count with the received activation count threshold value (R_Threshold) for the bank. As indicated by block 310, the method 300 may yet further include sending, by the memory controller, a mitigative refresh command to the DRAM device based on the result of comparing the row activation command count with the activation count threshold value (R_Threshold). For example, the memory controller may send a mitigative refresh command to the DRAM device when the row activation command count is greater than R_Threshold.

The above-described method 300 relates to the memory controller feature of sending mitigative refresh commands (RFM) to the DRAM based on the activation count threshold value (R_Threshold) provided by the DRAM. The remainder of the present disclosure relates mainly to DRAM features. As described below, such DRAM features may include, for example, one or more ways by which the DRAM may determine the activation count threshold value (R_Threshold), one or more ways by which the DRAM may reset per-row activation command counts, and other features.

Figure 4:
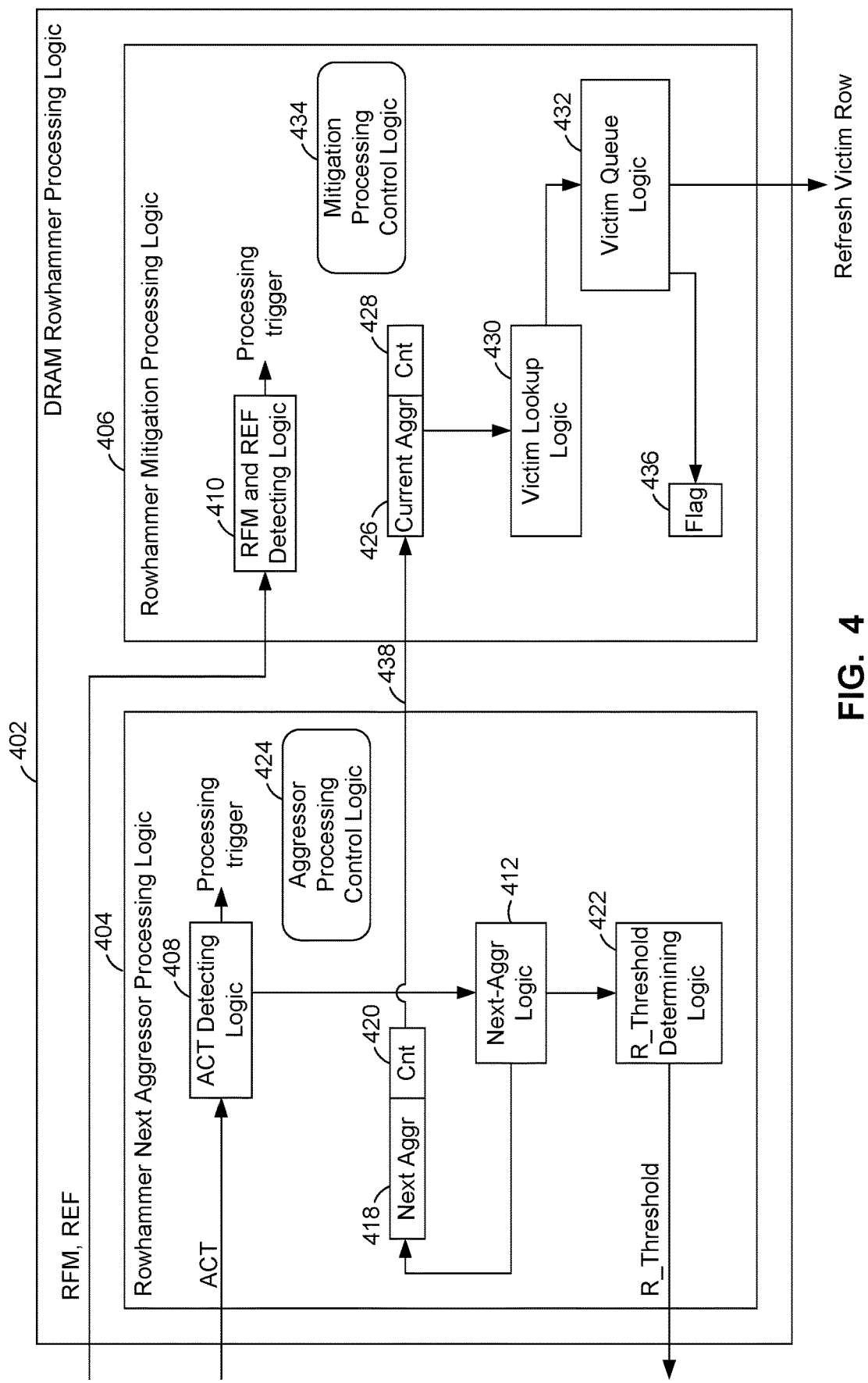
FIG. 4 is a block diagram of a system for per-row hammer tracking in a DRAM, in accordance with exemplary embodiments.

In FIG. 4 DRAM rowhammer mitigation processing circuitry/logic 402 is illustrated in block diagram form. The DRAM rowhammer processing logic 402 may be an example of the above-described DRAM rowhammer processing logic 228 (FIG. 2).

The DRAM rowhammer processing logic 402 may include rowhammer next aggressor processing circuitry/logic 404 and rowhammer mitigation processing circuitry/logic 406. The rowhammer next aggressor processing logic 404 may include activation command (ACT) detecting circuitry/logic 408 configured to monitor for, and to detect, activation commands that the DRAM receives from the memory controller. The rowhammer mitigation processing logic 406 may include refresh command detecting circuitry/logic 410 configured to monitor for, and to detect, both mitigative refresh commands (RFM) and periodically scheduled refresh commands (REF) that the DRAM receives from the memory controller.

The rowhammer next aggressor processing logic 404 may include, in addition to the above-described activation command detecting logic 408, next-aggressor circuitry/logic 412. Based on activation commands detected by the activation command detecting logic 408, the next-aggressor logic 412 may determine or identify the row to which the greatest number of row activation commands have been directed. Note that detection of an activation command by the activation command detecting logic 408 may serve as a trigger that initiates various processing actions in the rowhammer next aggressor processing logic 404, as described below.

The rowhammer next aggressor processing logic 404 may further include a next aggressor buffer or register 418 and associated next aggressor count buffer or register 420. The next aggressor register 418 may be configured to store information (e.g., a row number) identifying the row to which the greatest number of row activation commands have been directed. The associated next aggressor count register 420 may be configured to store that number, i.e., the number of activation commands directed to the row identified by the contents of the next aggressor register 418. For example, each time the activation command detecting logic 408 detects an activation command directed to a row, the next-aggressor logic 412 may obtain the activation command count of that newly activated row from the corresponding one of the PRHT counters 230 (FIG. 2), and compare that activation command count with the value stored in the next aggressor count register 420. If the activation command count of the newly activated row is greater than the value stored in the next aggressor count register 420, then the next-aggressor logic 412 may replace the information stored in the next aggressor register 418 with information identifying the newly activated row (now determined to have the greatest activation command count), and may replace the value stored in the next aggressor count register 420 with that row's activation command count. In this manner, the next aggressor register 418 may maintain or store a value indicating the row determined to have the greatest row activation command count, while the next aggressor count register 420 may maintain or store a value indicating the activation command count of that row. Alternatively, a register similar to the next aggressor register 418 may be used to store a pointer to the PRHT counter 230 (FIG. 2) corresponding to the row having the greatest activation command count.

The rowhammer next aggressor processing logic 404 may also include activation count threshold (R_Threshold) determining circuitry/logic 422. The activation count threshold determining logic 422 may be configured to operate in a manner described below to determine a value of the activation count threshold to provide to the memory controller.

The rowhammer next aggressor processing logic 404 may still further include aggressor processing control logic 424, configured to control aspects of the operation of the foregoing circuitry/logic elements of the rowhammer next aggressor processing logic 404. For purposes of clarity, some processing flow connections, signaling connections, and other interconnections among the foregoing elements of the rowhammer next aggressor processing logic 404 are not shown.

The rowhammer mitigation processing logic 406 may include, in addition to the above-described refresh command detecting logic 410, a current aggressor buffer or register 426 and an associated current aggressor count buffer or register 428. Based upon conditions described below, the value stored in the next aggressor register 418 may be copied into the current aggressor register 426, and the value stored in the next aggressor count register 420 may be copied into the current aggressor count register 428.

The rowhammer mitigation processing logic 406 may include victim lookup circuitry/logic 430. In response to information identifying a current aggressor row provided by the current aggressor register 426, the victim lookup logic 430 may be configured to provide information identifying one or more rows that are physically proximate to the current aggressor row and therefore potential victims of the current aggressor row.

The rowhammer mitigation processing logic 406 may include victim queue logic 432 configured to store information (i.e., in a "victim queue") identifying one or more victim rows that have been determined by the victim lookup logic 430. The stored information may be used to determine which rows to refresh. Accordingly, outputs of the victim queue logic 432 may include an indication or signal that initiates a refresh of a row. The victim queue logic 432 may also be configured to evaluate conditions such as whether its victim queue is empty, as described below. Note that detection of a refresh command by the refresh command detecting logic 410 may serve as a trigger that initiates further processing actions in the rowhammer mitigation processing logic 406, as described below.

The rowhammer mitigation processing logic 406 may still further include mitigation processing control logic 434, configured to control aspects of the operation of the foregoing circuitry/logic elements of the rowhammer mitigation processing logic 406. For purposes of clarity, some processing flow connections, signaling connections, and other interconnections among the foregoing elements of the rowhammer mitigation processing logic 406 are not shown. A flag 436 that is used in an exemplary method described below is shown. The flag 436 may be, for example, a register bit or other circuitry/logic that can selectively be configured to represent one of two states, which may be referred to as set or reset. Also, it should be understood that the logic elements described above with regard to FIG. 4 and the manner in which information is transferred among them are intended only as an example, and other examples will occur readily to one of ordinary skill in the art in view of the teachings herein.

Figure 5:
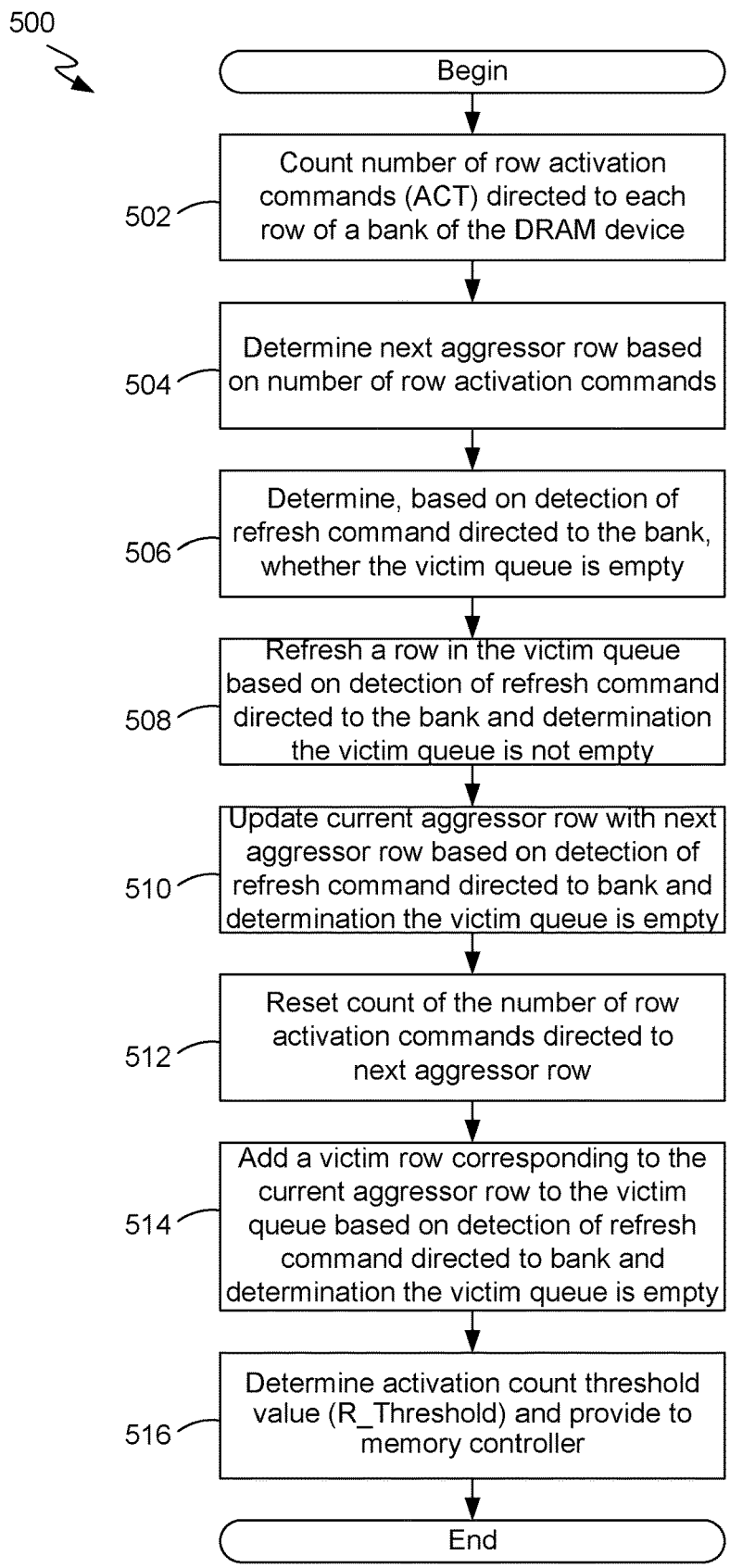
FIG. 5 is a flow diagram illustrating a method for per-row hammer tracking in a DRAM, in accordance with exemplary embodiments.

In FIG. 5 a method 500 for per-row hammer tracking in a DRAM device is illustrated in flow diagram form. The method 500 may represent an exemplary method of operation of the above-described DRAM rowhammer processing logic 402 (FIG. 4).

As indicated by block 502, the method 500 may include counting the number of row activation commands directed to each row of a bank. For example, as described above with regard to FIG. 2, PRHT counters 230 may operate to maintain such counts.

As indicated by block 504, the method 500 may include determining a next aggressor row based on the number of row activation commands. For example, the next aggressor row may be the row to which the greatest number of activation commands have been directed. In another example, the next aggressor row may be selected from among multiple potential next aggressor rows to which row activation commands have been directed, as described below.

As indicated by block 506, the method 500 may include determining whether a victim queue is empty. The determination of whether the victim queue is empty may be triggered by, or otherwise based on, detection of a refresh command directed to the bank.

As indicated by block 508, the method 500 may include refreshing a row in the victim queue. Refreshing the row may be triggered by, or otherwise based on, conditions that may include detection of a refresh command directed to the bank and a determination the victim queue is not empty.

As indicated by block 510, the method 500 may include updating the current aggressor row with the next aggressor row, i.e., replacing information identifying the current aggressor row with information identifying the next aggressor row. In the example described above with regard to FIG. 4, a path 438 for this updating or replacing is shown from the next aggressor register 418 to the current aggressor register 426. The updating or replacing may be triggered by, or otherwise based on, conditions that may include detection of a refresh command directed to the bank and a determination the victim queue is empty.

As indicated by block 512, the method 500 may include, following updating the current aggressor row, resetting the count of the number of row activation commands directed to the next aggressor row. In the example described above with regard to FIG. 4, the count of the number of row activation commands directed to the next aggressor row is stored in the next aggressor count register 420.

As indicated by block 514, the method 500 may include adding a victim row corresponding to the current aggressor row to the victim queue. Adding the victim row may be triggered by, or otherwise based on, conditions that may include detection of a refresh command directed to the bank and a determination the victim queue is empty. As described above with regard to FIG. 4, victim lookup logic 430 may be used to determine one or more victim rows of the current aggressor row.

As indicated by block 516, the method 500 may further include determining an activation count threshold (R_Threshold). The activation count threshold may be determined in various ways, examples of which are described below. In some examples, such as the "bucket" method described below, the determination may be based on information obtained from the PRHT counters 230 (FIG. 2). In an alternative example described below, the determination may be based on most-recent current aggressor rows. In still another example described below, the determination may be based on a "global" counter that counts activation commands across all banks. The DRAM may provide the determined activation count threshold to the memory controller (e.g., in response to being polled by the memory controller).

Figure 6:
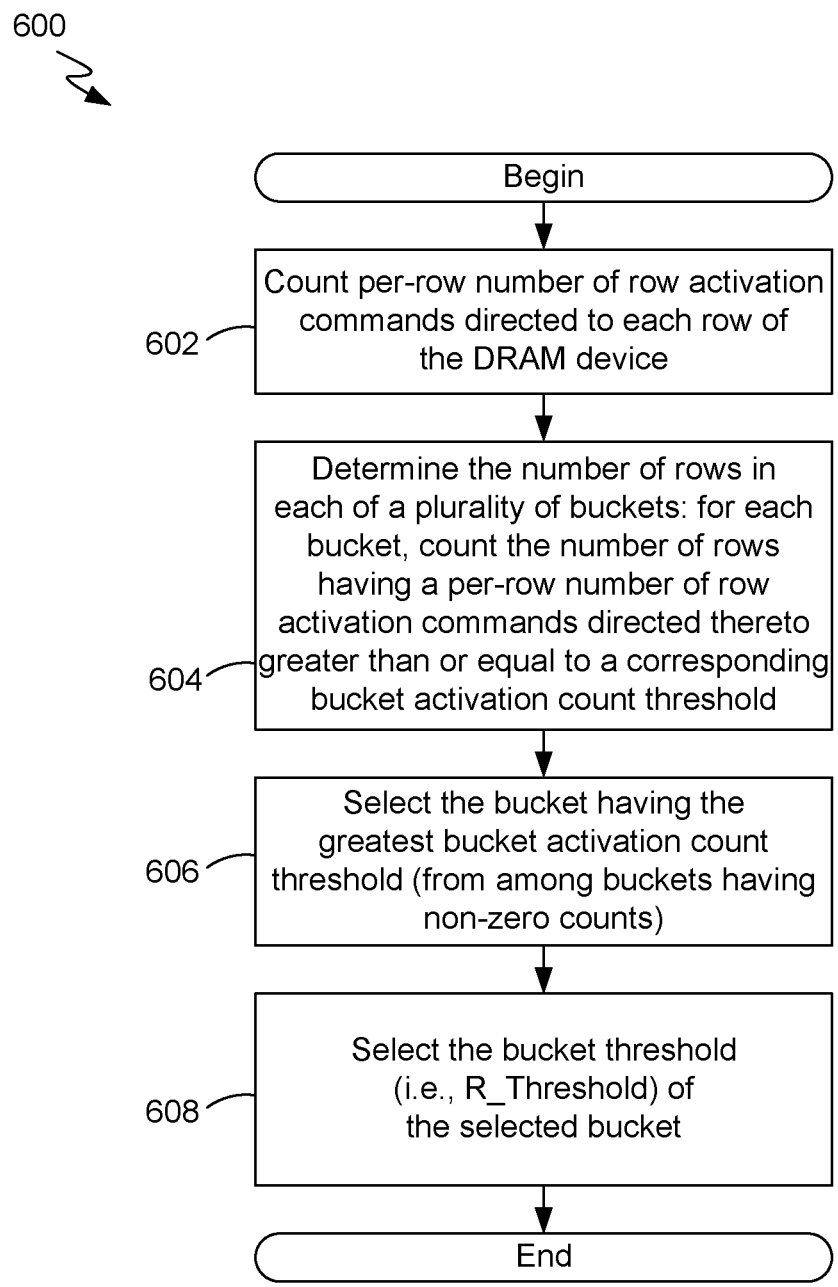
FIG. 6 is a flow diagram illustrating a method for determining an activation count threshold value using "buckets," in accordance with exemplary embodiments.

In FIG. 6, an exemplary method 600 by which a DRAM device may determine or select R_Threshold is illustrated in flow diagram form. As indicated by block 602, the method 600 may include counting the number of activation commands directed to each row of the DRAM device.

As indicated by block 604, the method 600 may also include determining the number of rows in each of a number of buckets. The term "buckets" is used herein for convenience to refer to a set of storage elements, such as data structures, counters, etc. This determination (block 604) may include, for each bucket, counting the number of rows having a per-row number of row activation commands directed thereto that is greater than or equal to the corresponding bucket activation count threshold of the bucket. In other words, there are a plurality of buckets or sets, and each bucket has a unique corresponding bucket activation count threshold (i.e., different from the bucket activation count thresholds of the other buckets). Each bucket may also have a unique corresponding bucket R_Threshold (i.e., different from the bucket R_Thresholds of the other buckets). The bucket R_Threshold may also be referred to for convenience as the "bucket threshold." Each bucket maintains a count of a number of rows. This row count may be incremented (conceptually, a row is "added to the bucket") when the number of row activation commands directed to that row is greater than or equal to the bucket activation count threshold of that bucket. An example of using such buckets is described below with regard to FIGS. 7A-7C.

As indicated by block 606, the method 600 may further include selecting the bucket having the greatest bucket activation count threshold (from among a subset of the buckets containing non-zero numbers of rows). As indicated by block 608, the method 600 may still further include selecting, by the DRAM device, the bucket R_Threshold of the selected (block 606) bucket. The DRAM device may provide an indication of the selected bucket R_Threshold to the memory controller.

Briefly referring again to FIG. 4, the R_Threshold determining logic 422 may include two or more data storage elements or "buckets" (not separately shown), each of which may comprise a data structure, a counter, etc. The R_Threshold determining logic 422 may maintain a row count for each of the buckets. Each bucket may have associated with it a unique bucket activation count threshold and a unique bucket R_Threshold. The R_Threshold determining logic 422 may increment the row count of a bucket when it is determined that a row's activation command count (as obtained from, for example, the above-described next-aggressor logic 412) has reached the bucket activation count threshold associated with that bucket. Conceptually, the R_Threshold determining logic 422 adds that row to the bucket. Conceptually, as further rows reach bucket activation count thresholds of that bucket, they are added to that bucket. Rows that reach bucket activation count thresholds of other buckets are similarly added to those buckets. The row count of each bucket thus represents the number of rows having a number of row activation commands directed thereto that is greater than or equal to the bucket activation count threshold of that bucket.

At any given time during operation, some of the buckets may have zero row counts (if no rows have yet reached the associated bucket threshold). However, from among those buckets having non-zero row counts, the R_Threshold determining logic 422 may select the bucket having the greatest associated bucket activation count threshold.

Figure 7A:
FIG. 7A is a table illustrating an example of an initial state in the method of FIG. 6, in accordance with exemplary embodiments.
Figure 7B:
FIG. 7B is a table illustrating an example of a later state in the method of FIG. 6, in accordance with exemplary embodiments.
Figure 7C:
FIG. 7C is a table illustrating an example of a still later state in the method of FIG. 6, in accordance with exemplary embodiments.

In FIGS. 7A, 7B and 7C, an example of a method for selecting an activation count thresholds (R_Threshold) using buckets is illustrated. Tables 702 (FIG. 7A), 704 (FIG. 7B) and 706 (FIG. 7C) may be implemented in the R_Threshold determining logic 422 as, for example, data structures. In the illustrated example, the rows of the tables 702-706 represent the following data storage elements or "buckets": a non-usable or reference bucket having a bucket activation count threshold of zero and a bucket R_Threshold that is not applicable ("N/A") or null; a first bucket having a bucket activation count threshold of 100 and a bucket R_Threshold of 300; a second bucket having a bucket activation count threshold of 250 and a bucket R_Threshold of 200; and a third bucket having a bucket activation count threshold of 500 and a bucket R_Threshold of 100. Although in the tables 702-706 there are three usable buckets, in other examples there may be any number of buckets. Also, the bucket activation count thresholds of 100, 250 and 500, and the bucket R_Thresholds of 300, 200 and 100 are intended only as examples, and may have any values. The following is an example of operation using the tables 702-706.

In FIG. 7A, the table 702 shows an initial state of operation in which the non-usable bucket has a row count of 65536, meaning that initially, all 65536 rows (e.g., all rows in an exemplary DRAM array) have had zero or more activation commands directed to each of them. The table 702 also shows that in that initial state of operation the first bucket has a row count of zero, meaning that initially, zero rows of the DRAM array have had 100 or more activation commands directed to each of them. The table 702 further shows that in the initial state of operation the second bucket has a row count of zero, meaning that initially, zero rows of the DRAM array have had 250 or more activation commands directed to each of them. The table 702 still further shows that in the initial state of operation the third bucket has a row count of zero, meaning that initially, zero rows of the DRAM array have had 500 or more activation commands directed to each of them. In this initial state of operation illustrated by the table 702, no bucket is selected because none of the usable buckets (i.e., the first, second or third buckets) has a non-zero row count. Accordingly, the unique identifier may be returned to the memory controller in response to a poll, as described above.

In FIG. 7B, the table 704 shows a later state of operation (i.e., later in time than the state shown in FIG. 7A) in which the non-usable bucket has a row count of 65536, meaning that all 65536 rows have had zero or more activation commands directed to each of them. The table 704 also shows that in this later state of operation the first bucket has a row count of 6224, meaning that 6224 rows of the DRAM array have had 100 or more activation commands directed to each of them. The table 704 further shows that in this later state of operation the second bucket has a row count of zero, meaning that zero rows of the DRAM array have had 250 or more activation commands directed to each of them. The table 704 still further shows that in this later state of operation the third bucket has a row count of zero, meaning that zero rows of the DRAM array have had 500 or more activation commands directed to each of them. In the state of operation illustrated by the table 704, the first bucket may be selected because, of all the buckets having non-zero row counts, the first bucket has the greatest bucket activation count threshold (100). Accordingly, the bucket R_Threshold of 300 that is associated with the first bucket may be returned to the memory controller in response to a poll as described above.

In FIG. 7C, the table 706 shows a still later state of operation (i.e., later in time than the state shown in FIG. 7B) in which the non-usable bucket has a row count of 65536, meaning that all 65536 rows have had zero or more activation commands directed to each of them. The table 706 also shows that in this still later state of operation the first bucket has a row count of 6224, meaning that 6224 rows of the DRAM array have had 100 or more activation commands directed to each of them. The table 706 further shows that in this later state of operation the second bucket has a row count of 554, meaning that 554 rows of the DRAM array have had 250 or more activation commands directed to each of them. The table 706 still further shows that in this later state of operation the third bucket has a row count of 29, meaning that 29 rows of the DRAM array have had 500 or more activation commands directed to each of them. In the state of operation illustrated by the table 706, the third bucket may be selected because, of all the buckets having non-zero row counts, the third bucket has the greatest bucket activation count threshold (500). Accordingly, the bucket R_Threshold of 100 that is associated with the third bucket may be selected as the value of R_Threshold that is provided to the memory controller.

Figure 8:
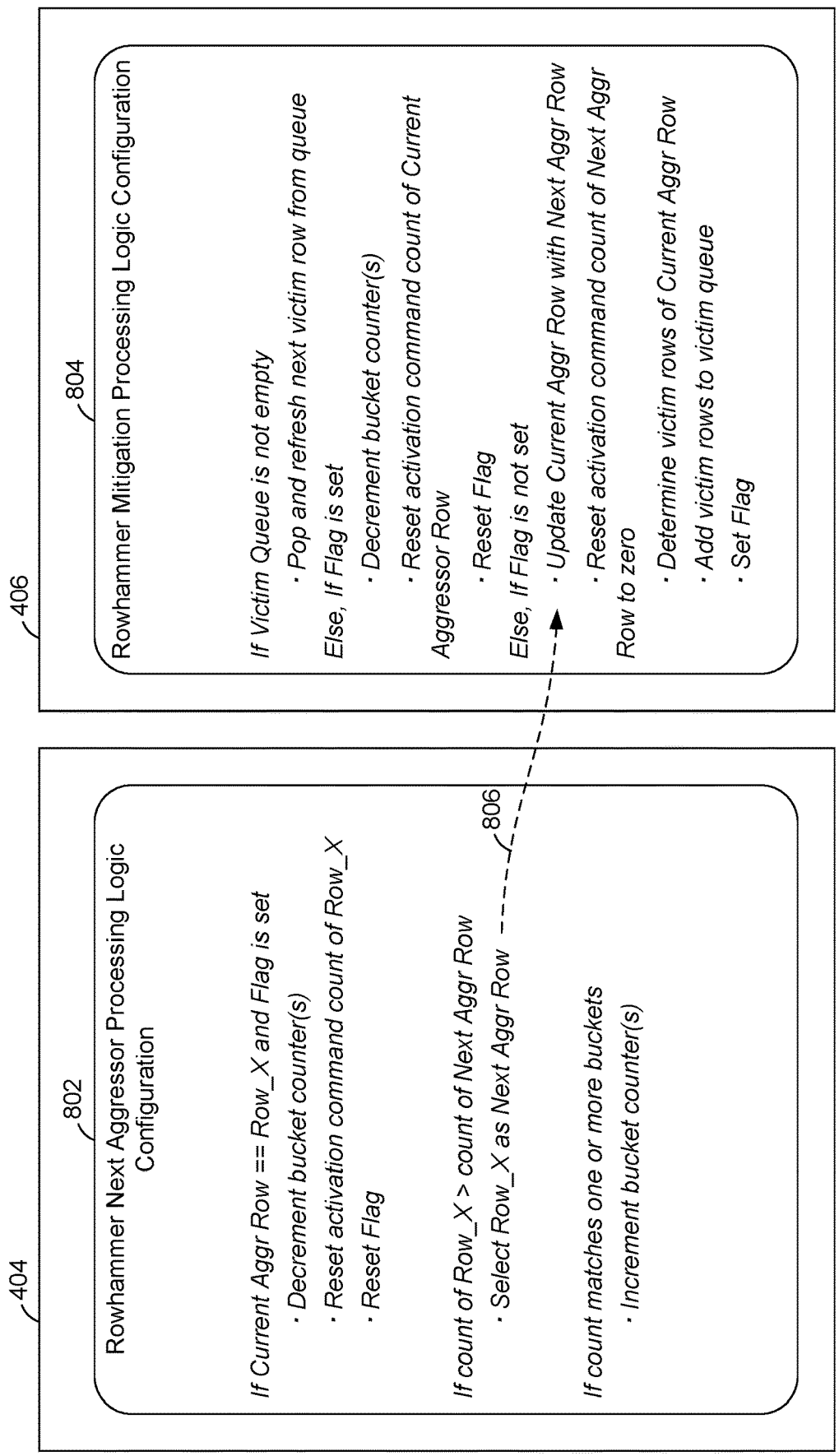
FIG. 8 illustrates configurations of aggressor processing logic and mitigation processing logic in a pseudo-code format, in accordance with exemplary embodiments.

In FIG. 8, an exemplary configuration 802 of the rowhammer next aggressor processing logic 404 (FIG. 4) and an exemplary configuration 804 of the rowhammer mitigation processing logic 406 (FIG. 4) are shown in a pseudocode format. That is, the configuration 802 controls the operation of the rowhammer next aggressor processing logic 404, while the configuration 804 controls the operation of the rowhammer mitigation processing logic 406.

The rowhammer next aggressor processing logic 404 (FIG. 4) and rowhammer mitigation processing logic 406 (FIG. 4) may be configured in any manner, including by hardware (e.g., finite state machines) or a combination of hardware and firmware. The operations indicated as performed by the rowhammer next aggressor processing logic 404 may be triggered by each detection of an activation command directed to a row, referred to in the pseudocode as Row_X. The operations indicated as performed by the rowhammer mitigation processing logic 406 may be triggered by each detection of a refresh (RFM or REF) command.

In the exemplary configurations 802 and 804, a flag is used to signal between the rowhammer next aggressor processing logic 404 and the rowhammer mitigation processing logic 406 (FIG. 4). The flag may, for example, represent the state of the flag register 436 described above with regard to FIG. 4. Also, the exemplary configurations 802 and 804 use the bucket method for determining R_Threshold as described above with regard to FIGS. 6 and 7A-C, but in other examples (not shown) other methods alternatively could be used. The indicated operations and their sequences are intended only to be exemplary, and others may occur readily to one of ordinary skill in the art in view of the teachings herein.

As indicated by the configuration 802, when the rowhammer next aggressor processing logic 404 detects an activation command, the rowhammer next aggressor processing logic 404 may determine whether Row_X is the current aggressor row (Current Aggr Row) and the Flag is set (e.g., by examining the contents of the current aggressor register 426 (FIG. 4) and flag 436, respectively). If Row_X is the current aggressor row and the Flag is set, then the rowhammer next aggressor processing logic 404 may decrement the count of each bucket counter containing Row_X. Also if Row_X is the current aggressor row and the Flag is set, then the rowhammer next aggressor processing logic 404 may reset the PRHT counter 230 (FIG. 2) of Row_X (e.g., to a value of one). Then the rowhammer next aggressor processing logic 404 may reset the Flag.

Then, the rowhammer next aggressor processing logic 404 may determine if the count of Row_X is greater than the count of the next aggressor row (Next Aggr Row). If the count of Row_X is greater than the count of the next aggressor row, then Row_X is selected as the next aggressor row, replacing any previously selected next aggressor row.

In addition, the rowhammer next aggressor processing logic 404 may increment the bucket counters when the rowhammer next aggressor processing logic 404 detects an activation command. That is, if the count of Row_X matches any one or more buckets, the counts of those one or more buckets are incremented.

As indicated by the configuration 804, when the rowhammer mitigation processing logic 406 detects a refresh command (either RFM or REF), the rowhammer mitigation processing logic 406 may determine whether the victim queue is empty. If the victim queue is not empty, then the rowhammer mitigation processing logic 406 may read and remove the next victim row from the victim queue. The victim queue may be a first-in-first-out ("FIFO") structure, a last-in-first-out ("LIFO") structure, or any other queue mechanism as understood by one of ordinary skill in the art. The rowhammer mitigation processing logic 406 may refresh the victim row that is removed from the victim queue.

If the rowhammer mitigation processing logic 406 determines that the victim queue is empty, the rowhammer mitigation processing logic 406 may then determine if the Flag is set. The Flag indicates whether to reset the count for the current aggressor row. If the victim queue is empty and the Flag is set, then the rowhammer mitigation processing logic 406 may decrement the count of each bucket counter containing the current aggressor row, reset the PRHT counter 230 (FIG. 2) of the current aggressor row (e.g., to zero), and then reset the Flag. The use of a Flag in this manner to signal between the rowhammer mitigation processing logic 406 and the rowhammer next aggressor processing logic 404 whether to reset the PRHT counter 230 for the current aggressor row, may be beneficial because in order to reset a PRHT counter 230 for a row, first the row must be activated, bringing the row data and the row PRHT count to the row buffer 224 (FIG. 2), second the row counter must be reset, and third the bank must be precharged to ensure that the new PRHT count is stored in DRAM, and resetting the PRHT counter 230 of the row under control of the rowhammer next aggressor processing logic 404 when such row is already activated reduces the need for such activation and precharge command, reducing the amount of work for the rowhammer mitigation processing logic 406.

If the rowhammer mitigation processing logic 406 determines that the victim queue is empty and the Flag is not set, then the rowhammer mitigation processing logic 406 may update the current aggressor row with the next aggressor row. That is, the value of the current aggressor row may be replaced with the value of the next aggressor row. This updating is indicated by the broken-line arrow 806.

Then, the rowhammer mitigation processing logic 406 may reset (e.g., to zero) the count 420 (FIG. 4) of the next aggressor row. The rowhammer mitigation processing logic 406 may then determine the victim rows of the current aggressor row and add them to the victim queue. For example, where a row R is the current aggressor row, the rowhammer mitigation processing logic 406 may determine that rows R−1 and R+1, i.e., rows that are physically adjacent to row R, are the corresponding victim rows. Lastly, the rowhammer mitigation processing logic 406 may set the Flag, thereby signaling to the rowhammer next aggressor processing logic 404 (FIG. 4) that the count for the current aggressor row needs to be reset.

When the rowhammer next aggressor processing logic 404 detects the next row activation command following the above-described updating of the current aggressor row with the next aggressor row by the rowhammer mitigation processing logic 406, the rowhammer next aggressor processing logic 404 may detect that the Flag has been set and may therefore reset the count of the current aggressor row. As noted above, the Flag is a way for the rowhammer mitigation processing logic 406 to signal the rowhammer next aggressor processing logic 404 that the count of the current aggressor row needs to be reset. More generally, when the next row activation command is received, the current aggressor row having been updated with the next aggressor row (as triggered by a refresh command preceding this "next" row activation command), then the count of the current aggressor row may be reset. A "set" state of the Flag indicates that the current aggressor row was updated with the next aggressor row after a refresh command preceding this "next" row activation command (i.e. the row activation command that triggered the operations indicated by the configuration 802) and that the count of the updated or now-current aggressor row has not yet been reset. The Flag is an example of a way to control this sequence of operations in the exemplary DRAM rowhammer processing logic 402 (FIG. 4).

Figure 9:
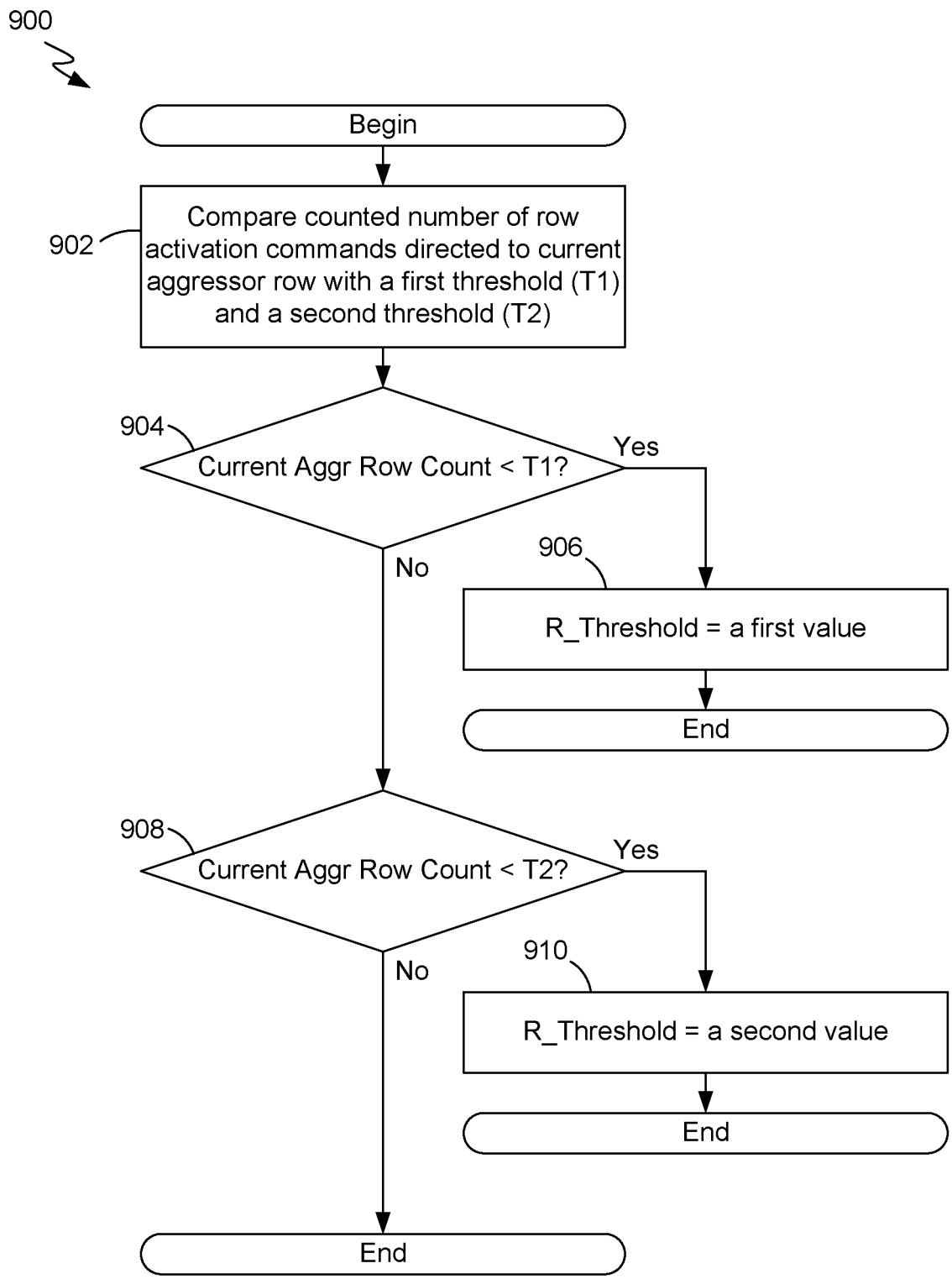
FIG. 9 is a flow diagram illustrating a method for determining an activation count threshold value using comparisons with one or more thresholds, in accordance with exemplary embodiments.

In FIG. 9, an exemplary method 900 by which a DRAM device may determine or select the activation count threshold (R_Threshold) is illustrated in flow diagram form. While the method 600 described above with regard to FIG. 6 uses "buckets" to determine a value of R_Threshold, this alternative method 900 uses a comparison of the number of row activation commands directed to the current aggressor row with at least one threshold value to determine a value of R_Threshold.

As indicated by block 902, the method 900 may include comparing the counted number of row activation commands directed to the current aggressor row with a first threshold value T1 and a second threshold value T2. In the method 900, one of two values (i.e., predetermined numbers or constants) may be selected as the value of R_Threshold. As indicated by block 904, it may be determined whether the number of row activation commands directed to the current aggressor row is less than the first threshold value T1. If it is determined that the number of row activation commands directed to the current aggressor row is less than the first threshold value T1, then the first value may be selected as the value of R_Threshold, as indicated by block 906. As indicated by block 908, if it is determined that the number of row activation commands directed to the current aggressor row is not less than the first threshold value T1, then it may be determined whether the number of row activation commands directed to the current aggressor row is less than the second threshold value T2. If it is determined that the number of row activation commands directed to the current aggressor row is less than the second threshold value T2, then the second value may be selected as the value of R_Threshold, as indicated by block 910.

The method 900 may be employed in, for example, the above-described DRAM rowhammer processing logic 402 (FIG. 4). The DRAM rowhammer processing logic 402 may be configured in a manner similar to that described above with regard to FIG. 8, but omitting the incrementing and decrementing of bucket counters. Instead of being configured to perform the method 600 (FIG. 6) or another method, the R_Threshold determining logic 422 (FIG. 4) may be configured to perform the method 900. The R_Threshold determining logic 422 may be configured to obtain the contents of the current aggressor count register 428, as indicated by the broken-line arrow 442.

Figure 10:
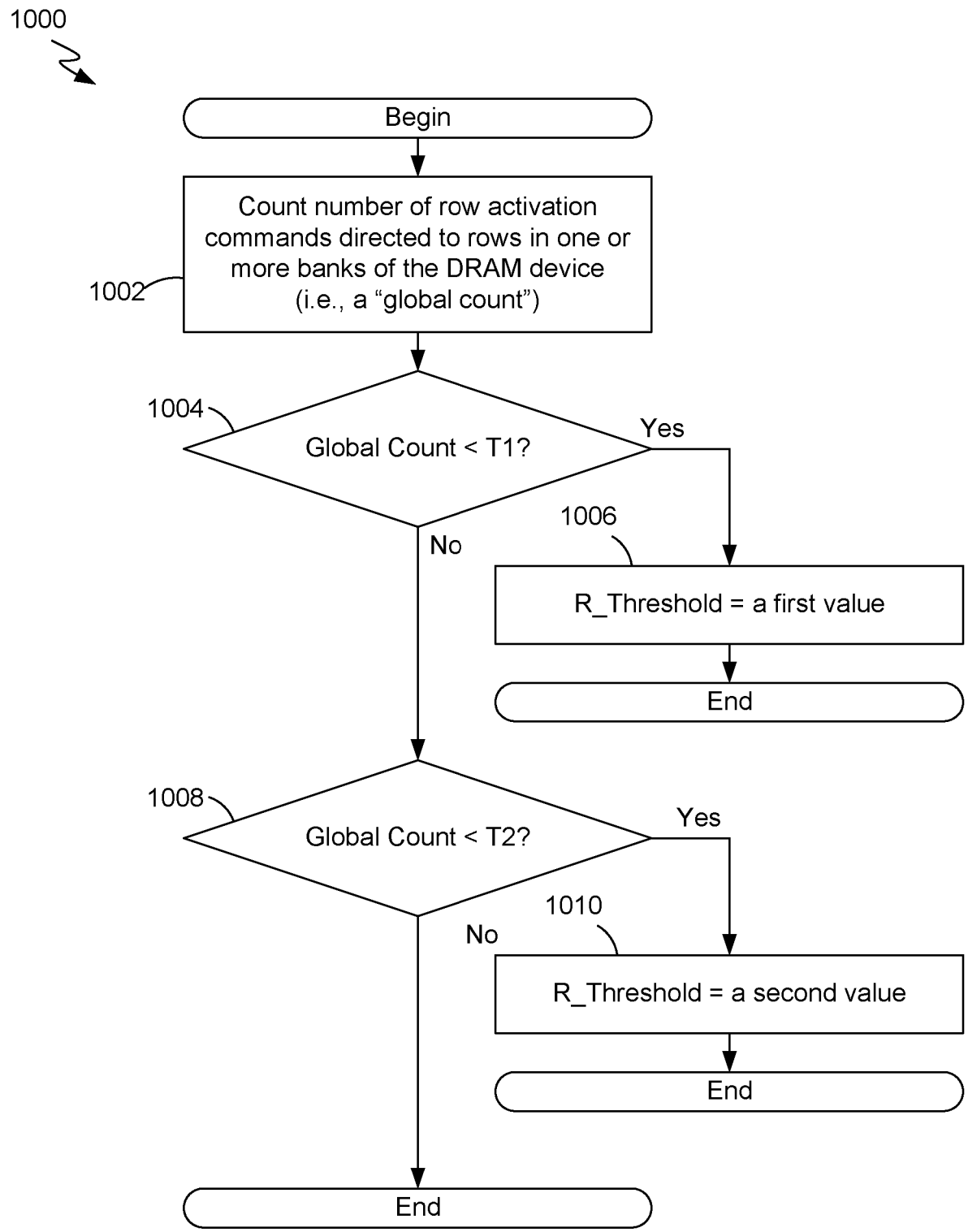
FIG. 10 is a flow diagram illustrating a method for determining an activation count threshold value using a global count, in accordance with exemplary embodiments.

In FIG. 10, another exemplary method 1000 by which a DRAM device may determine or select the activation count threshold (R_Threshold) is illustrated in flow diagram form. In contrast with the above-described methods 600 (FIG. 6) and 900 (FIG. 9), the method 1000 uses a comparison of a "global count" with at least one threshold value to determine a value of R_Threshold. The method 1000 may be employed in a system similar to the above-described DRAM rowhammer processing logic 402 (FIG. 4) but further including a global counter (not shown in FIG. 4). In view of this similarity, such a system is not separately shown.

As indicated by block 1002, the method 1000 may include maintaining a "global count" of the number of row activation commands directed to all rows (in all of the one or more banks). The method 1000 may further include comparing the global count with a first threshold value T1 and a second threshold value T2. In the method 1000, one of two values (i.e., predetermined numbers or constants) may be selected as the value of R_Threshold. As indicated by block 1004, it may be determined whether the global count is less than the first threshold value T1. If it is determined that the global count is less than the first threshold value T1, then the first value may be selected as the value of R_Threshold, as indicated by block 1006. As indicated by block 1008, if it is determined that the global count is not less than the first threshold value T1, then it may be determined whether the global count is less than the second threshold value T2. If it is determined that the global count is less than the second threshold value T2, then the second value may be selected as the value of R_Threshold, as indicated by block 1010.

Figure 11:
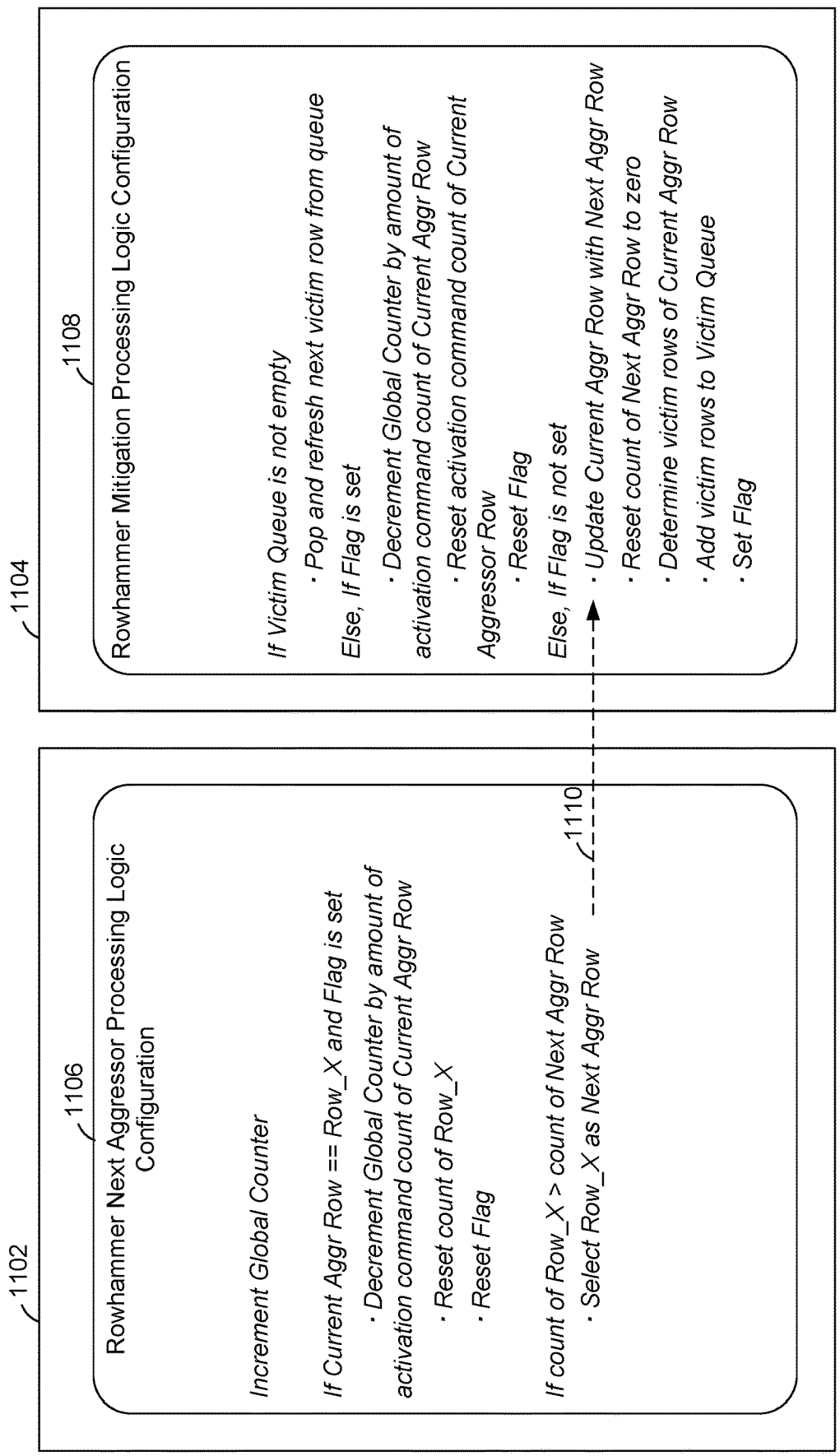
FIG. 11 illustrates further configurations of aggressor processing logic and mitigation processing logic in a pseudo-code format, in accordance with exemplary embodiments.

In FIG. 11, rowhammer next aggressor processing logic 1102 that is similar to the rowhammer next aggressor processing logic 404 (FIG. 4) but having a global counter (not shown) may have an exemplary configuration 1106, shown in pseudocode format. Rowhammer mitigation processing logic 1104 that is similar to the rowhammer mitigation processing logic 406 (FIG. 4) may have an exemplary configuration 1108, shown in pseudocode format. As indicated by the configuration 1106, when the rowhammer next aggressor processing logic 1102 detects an activation command, the rowhammer next aggressor processing logic 1102 may increment the global counter.

Then, the rowhammer next aggressor processing logic 1102 may determine whether Row_X is the current aggressor row (Current Aggr Row) and the Flag is set (e.g., by examining the contents of the current aggressor register (FIG. 12) and Flag, respectively). If Row_X is the current aggressor row and the Flag is set, then the rowhammer next aggressor processing logic 1102 may decrement the global counter by an amount equal to the activation command count of the current aggressor row. Also if Row_X is the current aggressor row and the Flag is set, then the rowhammer next aggressor processing logic 1102 may reset the activation command count of Row_X (e.g., to one). Then, the rowhammer next aggressor processing logic 1102 may reset the Flag.

Next, the rowhammer next aggressor processing logic 1102 may determine if the count of Row_X is greater than the count of the next aggressor row (Next Aggr Row). If the count of Row_X is greater than the count of the next aggressor row, then Row_X is selected as the next aggressor row, replacing any previously selected next aggressor row.

As indicated by the configuration 1108, when the rowhammer mitigation processing logic 1104 detects a refresh command (either RFM or REF), the rowhammer mitigation processing logic 1104 may determine whether the victim queue is empty. If the victim queue is not empty, then the rowhammer mitigation processing logic 1104 may read and remove a next victim row from the victim queue. The rowhammer mitigation processing logic 1104 may refresh the victim row that is read and removed from the victim queue.

If the rowhammer mitigation processing logic 1104 determines that the victim queue is empty, the rowhammer mitigation processing logic 1104 may then determine if the Flag is set. If the victim queue is empty and the Flag is set, then the rowhammer mitigation processing logic 1104 may decrement the global counter by an amount equal to the activation command count of the current aggressor row, reset the activation command count of the current aggressor row (e.g., to zero), and then reset the Flag.

If the rowhammer mitigation processing logic 1104 determines that the victim queue is empty and the Flag is not set, then the rowhammer mitigation processing logic 1104 may update the current aggressor row with the next aggressor row, as indicated by the broken-line arrow 1110. Then, the rowhammer mitigation processing logic 1104 may reset (e.g., to zero) the count of the next aggressor row, determine the victim rows of the current aggressor row, add the victim rows to the victim queue, and set the Flag.

Figure 12:
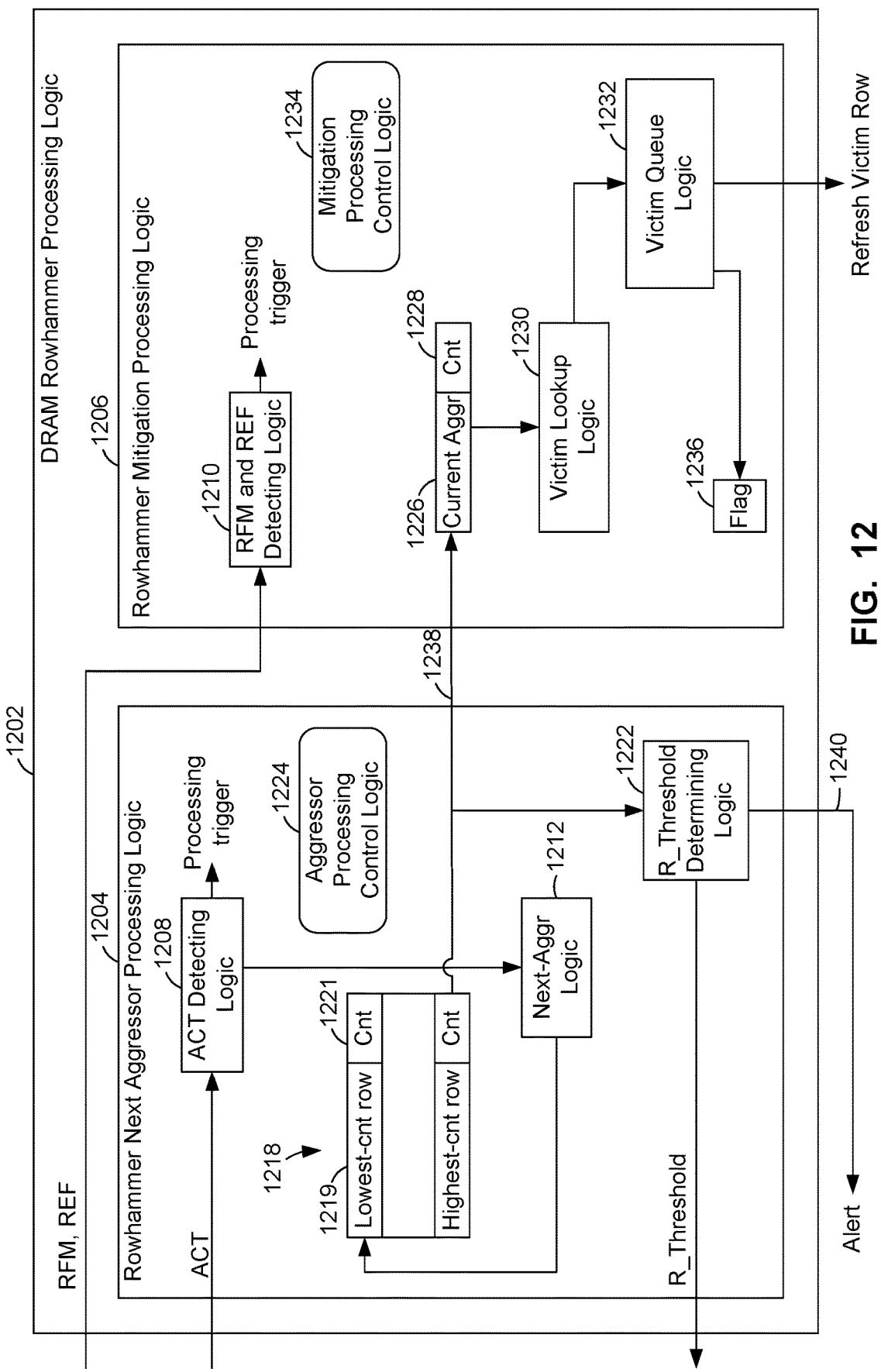
FIG. 12 is a block diagram of another system for per-row hammer tracking in a DRAM, in accordance with exemplary embodiments.

In FIG. 12, DRAM rowhammer processing circuitry/logic 1202 is illustrated in block diagram form. The DRAM rowhammer processing logic 1202 may be another example of the above-described DRAM rowhammer processing logic 228 (FIG. 2). The DRAM rowhammer processing logic 1202 may include rowhammer next aggressor processing circuitry/logic 1204 and rowhammer mitigation processing circuitry/logic 1206. In the example illustrated in FIG. 12, the rowhammer next aggressor processing logic 1204 may be configured to keep track of multiple aggressor rows.

The rowhammer next aggressor processing circuitry/logic 1204 may include activation command (ACT) detecting circuitry/logic 1208 configured to monitor for, and to detect, activation commands that the DRAM receives from the memory controller. Detection of an activation command by the activation command detecting logic 1208 may serve as a trigger that initiates further processing actions in the rowhammer next aggressor processing logic 1204, as described below. The rowhammer mitigation processing circuitry/logic 1206 may include refresh command detecting circuitry/logic 1210 configured to monitor for, and to detect, both mitigative refresh commands (RFM) and periodically scheduled refresh commands (REF) that the DRAM receives from the memory controller. Detection of a refresh command by the refresh command detecting circuitry/logic 1210 may serve as a trigger that initiates further processing actions in the rowhammer mitigation processing logic 1206, as described below.

The rowhammer next aggressor processing logic 1204 may include, in addition to the above-described activation command detecting logic 1208, next-aggressor circuitry/logic 1212. The rowhammer next aggressor processing logic 1204 may also include an aggressor queue 1218 configured to keep track of aggressor rows. The aggressor queue 1218 may include information 1219 identifying at least the row having the highest activation command count ("highest-cnt row") and the row having the lowest activation command count ("lowest-cnt row") and these rows' respective counts 1221. Each time the activation command detecting logic 1208 detects an activation command directed to a row, the next-aggressor logic 1212 may update the aggressor queue 1218 to indicate the lowest-count row and the highest-count row.

The rowhammer next aggressor processing logic 1204 may also include activation count threshold (R_Threshold) determining circuitry/logic 1222. The activation count threshold determining logic 1222 may be configured to operate in a manner described below (FIGS. 13A-13B) to determine a value of the activation count threshold to provide to the memory controller.

The rowhammer next aggressor processing logic 1204 may still further include aggressor processing control logic 1224, configured to control aspects of the operation of the foregoing circuitry/logic elements of the rowhammer next aggressor processing logic 1204. For purposes of clarity, some processing flow connections, signaling connections, and other interconnections among the foregoing elements of the rowhammer next aggressor processing logic 1204 are not shown.

The rowhammer mitigation processing logic 1206 may include, in addition to the above-described refresh command detecting logic 1210, a current aggressor buffer or register 1226 and an associated current aggressor count buffer or register 1228. Note that the highest-count row is analogous to the next aggressor row in other examples described above. Accordingly, based upon conditions described below, information identifying the highest-count row may be copied into the current aggressor register 1226.

The rowhammer mitigation processing logic 1206 may include victim lookup circuitry/logic 1230. In response to information identifying a current aggressor row provided by the current aggressor register 1226, the victim lookup logic 1230 may be configured to provide information identifying one or more rows that are adjacent to the current aggressor row and therefore potential victims of the current aggressor row.

The rowhammer mitigation processing logic 1206 may include victim queue logic 1232 configured to store information identifying one or more victim rows that have been determined by the victim lookup logic 1230. The stored information may be used to determine which rows to refresh.

The rowhammer mitigation processing logic 1206 may still further include mitigation processing control logic 1234, configured to control aspects of the operation of the foregoing circuitry/logic elements of the rowhammer mitigation processing logic 1206. For purposes of clarity, some processing flow connections, signaling connections, and other interconnections among the foregoing elements of the rowhammer mitigation processing logic 1206 are not shown. A flag 1236 that is used in an exemplary method described below is shown. The flag 1236 may be, for example, a register bit or other circuitry/logic that can selectively be configured to represent one of two states, which may be referred to as set or reset. Also, it should be understood that the logic elements described above with regard to FIG. 12 and the manner in which information is transferred among them are intended only as an example, and other examples will occur readily to one of ordinary skill in the art in view of the teachings herein.

Figure 13A:
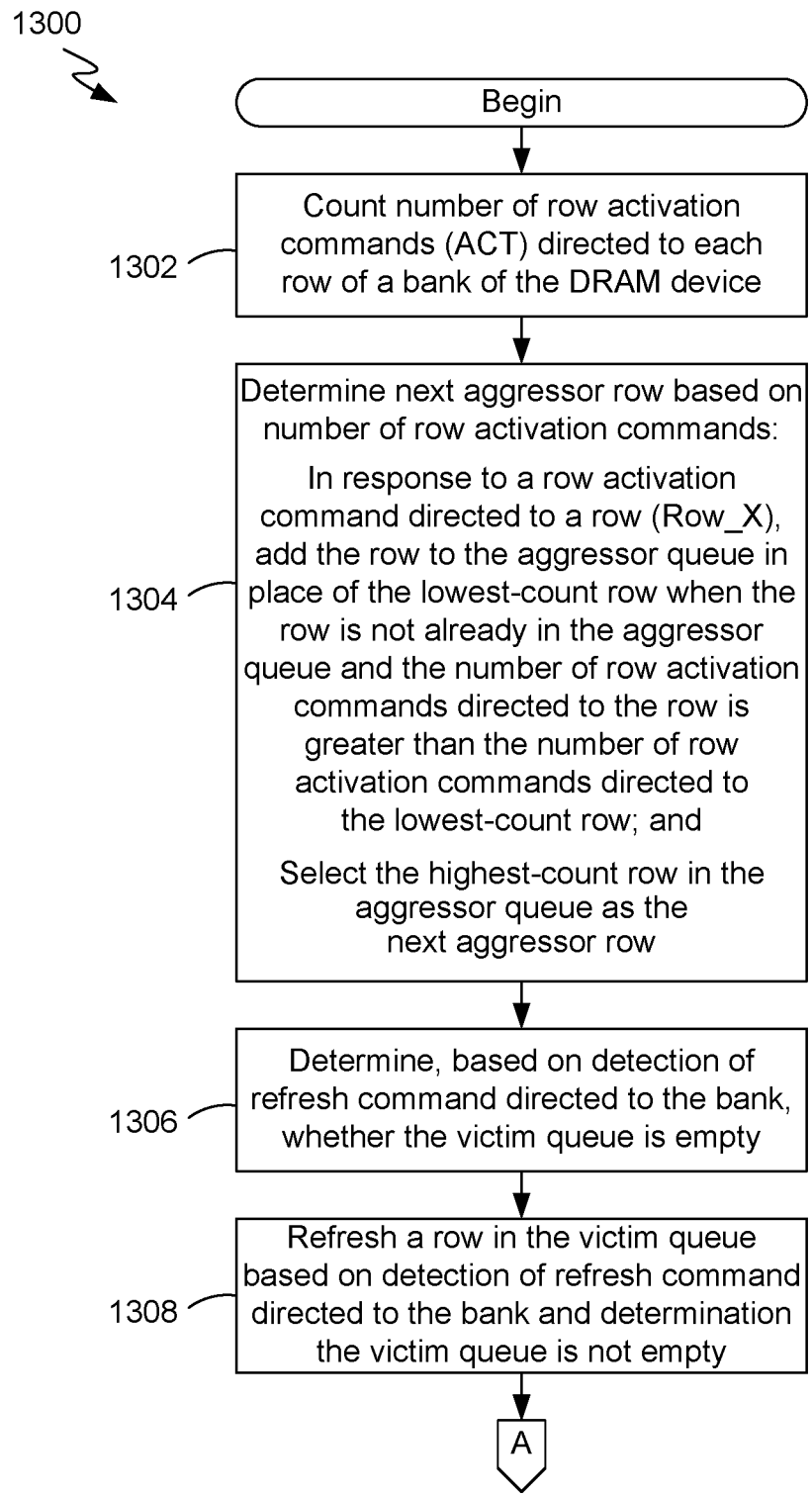
FIG. 13A is a flow diagram illustrating another method for per-row hammer tracking in a DRAM, in accordance with exemplary embodiments.
Figure 13B:
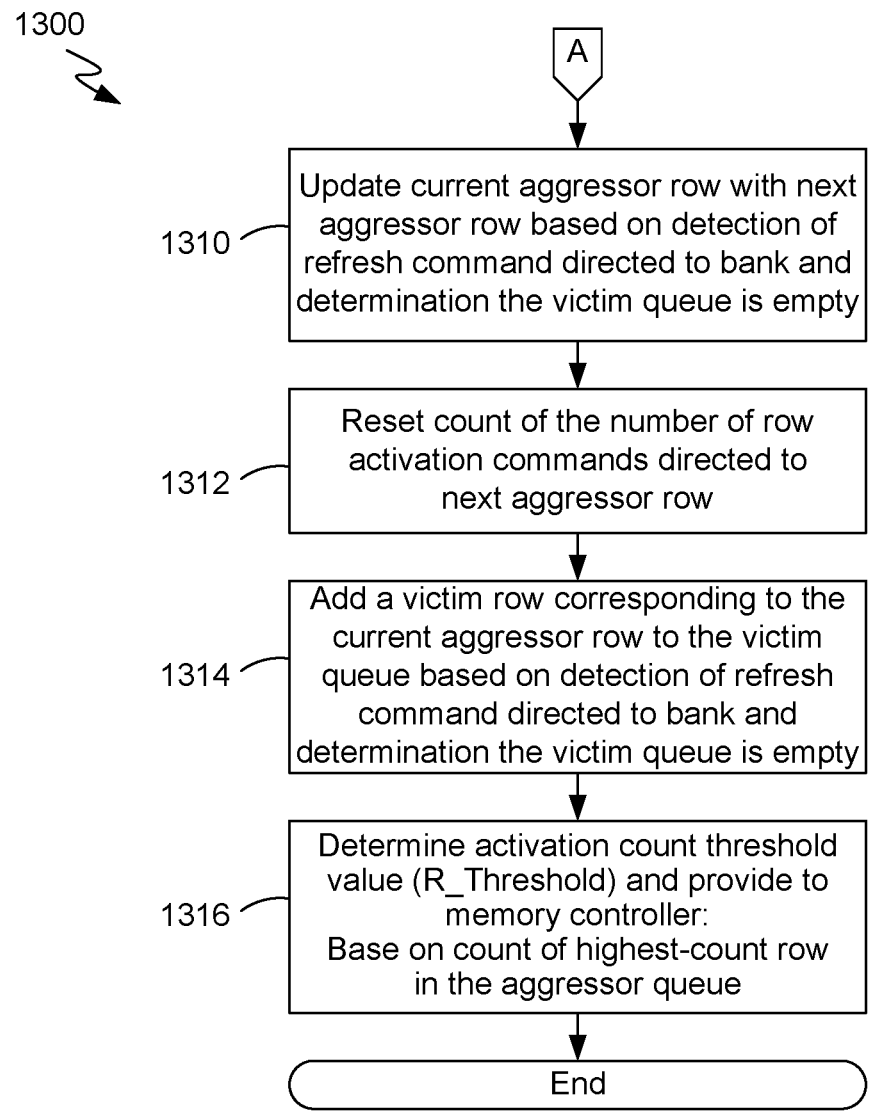
FIG. 13B is a continuation of the flow diagram of FIG. 13A.

In FIGS. 13A-13B, a method 1300 for per-row hammer tracking in a DRAM device is illustrated in flow diagram form. The method 1300 may represent an exemplary method of operation of the above-described DRAM rowhammer processing logic 1202 (FIG. 12).

As indicated by block 1302, the method 1300 may include counting the number of row activation commands directed to each row of a bank. For example, as described above with regard to FIG. 2, PRHT counters 230 may operate to maintain such counts.

As indicated by block 1304, the method 1300 may include determining a next aggressor row from among multiple aggressor rows to which row activation commands have been directed. For example, as described above with regard to FIG. 12, an aggressor queue 1218 (or alternatively, pointers to rows in such a queue) may be used to keep track of such multiple aggressor rows, including a lowest-count row and a highest-count row. The actions relating to block 1304 may be performed in response to each detected row activation command. The row may be added to the aggressor queue in place of the lowest-count row when the row is not already in the aggressor queue and the number of row activation commands directed to that row is greater than the number of row activation commands that have been directed to the lowest-count row. If the just-activated row Row_X is already in the queue, its count in the queue is incremented and if it now exceeds the activation count for the highest-count row, Row_X becomes the new highest-count row. Then, the highest-count row in the aggressor queue may be selected as the next aggressor row.

As indicated by block 1306, the method 1300 may include determining whether a victim queue is empty. The determination of whether the victim queue is empty may be triggered by, or otherwise based on, detection of a refresh command directed to the bank.

As indicated by block 1308, the method 1300 may include refreshing a row in the victim queue. Refreshing the row may be triggered by, or otherwise based on, conditions that may include detection of a refresh command directed to the bank and a determination the victim queue is not empty.

As indicated by block 1310 (FIG. 13B), the method 1300 may include updating a current aggressor row with the next aggressor row, i.e., replacing information identifying the current aggressor row with information identifying the next aggressor row. In the example described above with regard to FIG. 12, a path 1238 for this updating or replacing is shown from the aggressor queue 1218 (specifically, the highest-count row) to the current aggressor register 1226. The updating or replacing may be triggered by, or otherwise based on, conditions that may include detection of a refresh command directed to the bank and a determination the victim queue is empty.

As indicated by block 1312, the method 1300 may include, following updating the current aggressor row, resetting the count of the number of row activation commands directed to the next aggressor row. In the example described above with regard to FIG. 12, the count of the number of row activation commands directed to the next aggressor row may be found in the aggressor queue 1218, the activation command counting logic 1212, or a structure (not shown) combining features of both.

As indicated by block 1314, the method 1300 may include adding a victim row corresponding to the current aggressor row to the victim queue. Adding the victim row may be triggered by, or otherwise based on, conditions that may include detection of a refresh command directed to the bank and a determination the victim queue is empty. As described above with regard to FIG. 12, victim lookup logic 1230 may be used to determine one or more victim rows of the current aggressor row.

As indicated by block 1316, the method 1300 may further include determining an activation count threshold (R_Threshold). The activation count threshold may be determined based on the count of the highest-count row. In the example described above with regard to FIG. 12, the highest-count row may be indicated by the aggressor queue 1218 (or a pointer to such a queue).

Referring briefly again to FIG. 12, the activation count threshold (R_Threshold) determining logic may issue an alert 1240 to the memory controller in addition to, or alternatively to, determining and providing a value of R_Threshold. Such an alert may be provided based on a comparison of any of the various counts (or values derived from a count) described herein with a threshold.

Figure 14:
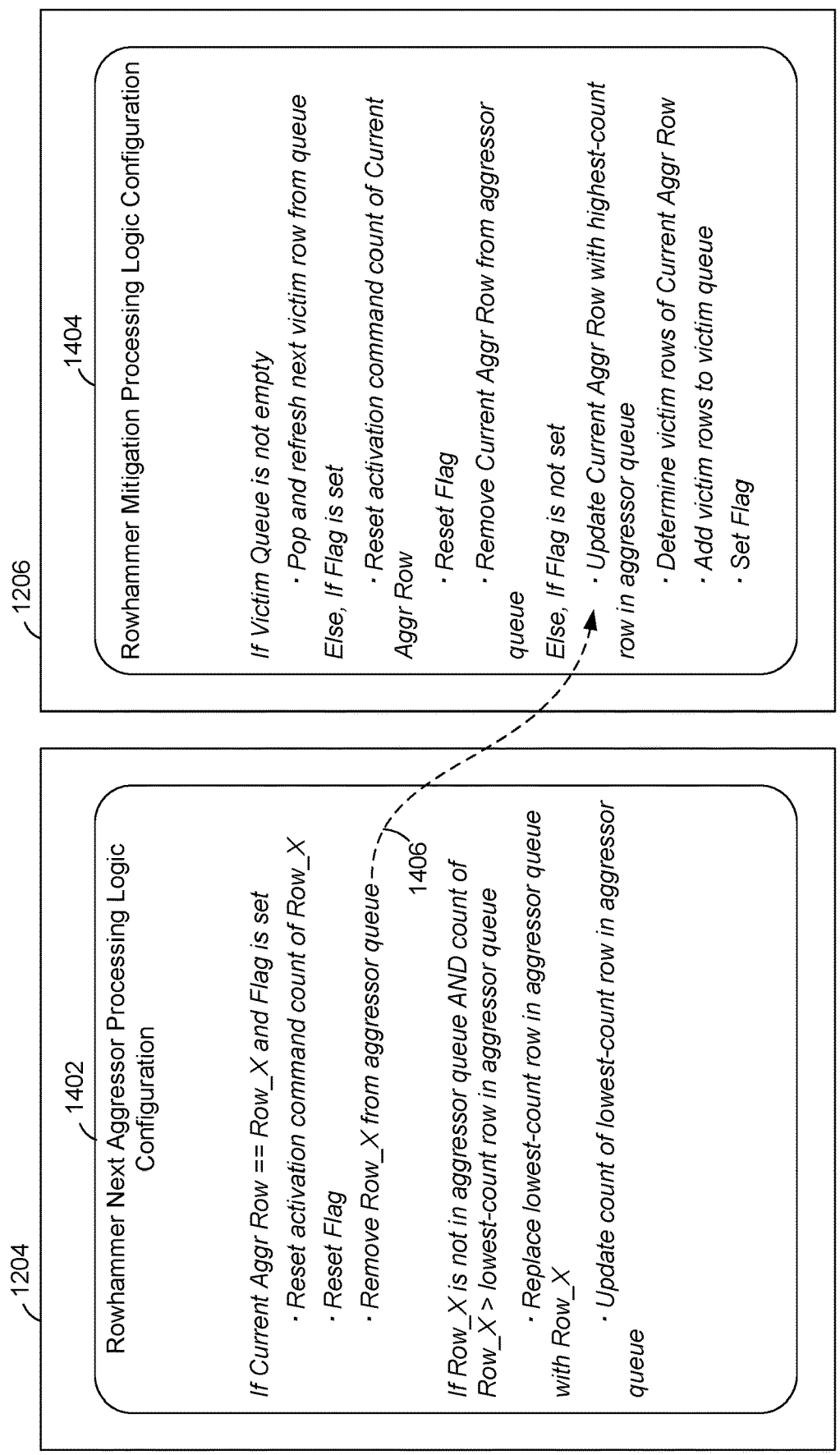
FIG. 14 illustrates yet other configurations of aggressor processing logic and mitigation processing logic in a pseudo-code format, in accordance with exemplary embodiments.

In FIG. 14, an exemplary configuration 1402 of the rowhammer next aggressor processing logic 1204 (FIG. 12) and an exemplary configuration 1404 of the rowhammer mitigation processing logic 1206 (FIG. 12) are shown in pseudocode format. With reference to the configuration 1402, when the rowhammer next aggressor processing logic 1204 detects an activation command directed to Row_X, the rowhammer next aggressor processing logic 1204 may determine whether Row_X is the current aggressor row (Current Aggr Row) and the Flag is set (e.g., by examining the contents of the current aggressor register 1226 (FIG. 12) and Flag 1236, respectively). If Row_X is the current aggressor row and the Flag is set, then the rowhammer next aggressor processing logic 1204 may reset the count of Row_X (e.g., to a value of one). Then the rowhammer next aggressor processing logic 1204 may reset the Flag and remove Row_X from the aggressor queue 1218. Note that when a row is removed from the aggressor queue 1218, the highest-count row may update.

Next, the rowhammer next aggressor processing logic 1204 may determine whether Row_X is already in the aggressor queue 1218 (FIG. 12) and may compare the activation command count of Row_X with the lowest-count row in the aggressor queue 1218. If Row_X is already in the aggressor queue 1218 and the activation command count of Row_X is greater than the activation command count of the lowest-count row in the aggressor queue 1218, then the lowest-count row in the aggressor queue 1218 may be replaced with Row_X. That is, the information 1219 identifying the lowest-count row and its corresponding count 1221 may be updated. As described above with regard to FIG. 12, tracking the lowest-count and highest-count rows in such a queue may be implemented using pointers, for example.

With reference to the configuration 1404 (FIG. 14), when the rowhammer mitigation processing logic 1206 (FIG. 12) detects a refresh command (either RFM or REF), the rowhammer mitigation processing logic 1206 may determine whether the victim queue is empty. If the victim queue is not empty, then the rowhammer mitigation processing logic 1206 may read and remove a next victim row from the victim queue. The rowhammer mitigation processing logic 406 may refresh the victim row that is read and removed from the victim queue 1232.

If the rowhammer mitigation processing logic 1206 (FIG. 12) determines that the victim queue is empty, the rowhammer mitigation processing logic 1206 may then determine if the Flag is set. If the victim queue is empty and the Flag is set, then the rowhammer mitigation processing logic 1206 may reset the count of the current aggressor row (e.g., to zero), reset the Flag, and remove the current aggressor row from the aggressor queue 1218.

If the rowhammer mitigation processing logic 1206 (FIG. 12) determines that the victim queue is empty and the Flag is not set, then the rowhammer mitigation processing logic 1206 may update the current aggressor row with the highest-count row in the aggressor queue 1218, as indicated by the broken-line arrow 1406. Then, the rowhammer mitigation processing logic 1206 may reset (e.g., to zero) the count of the next aggressor row, determine the victim rows of the current aggressor row, add the victim rows to the victim queue, and set the Flag.

Figure 15:
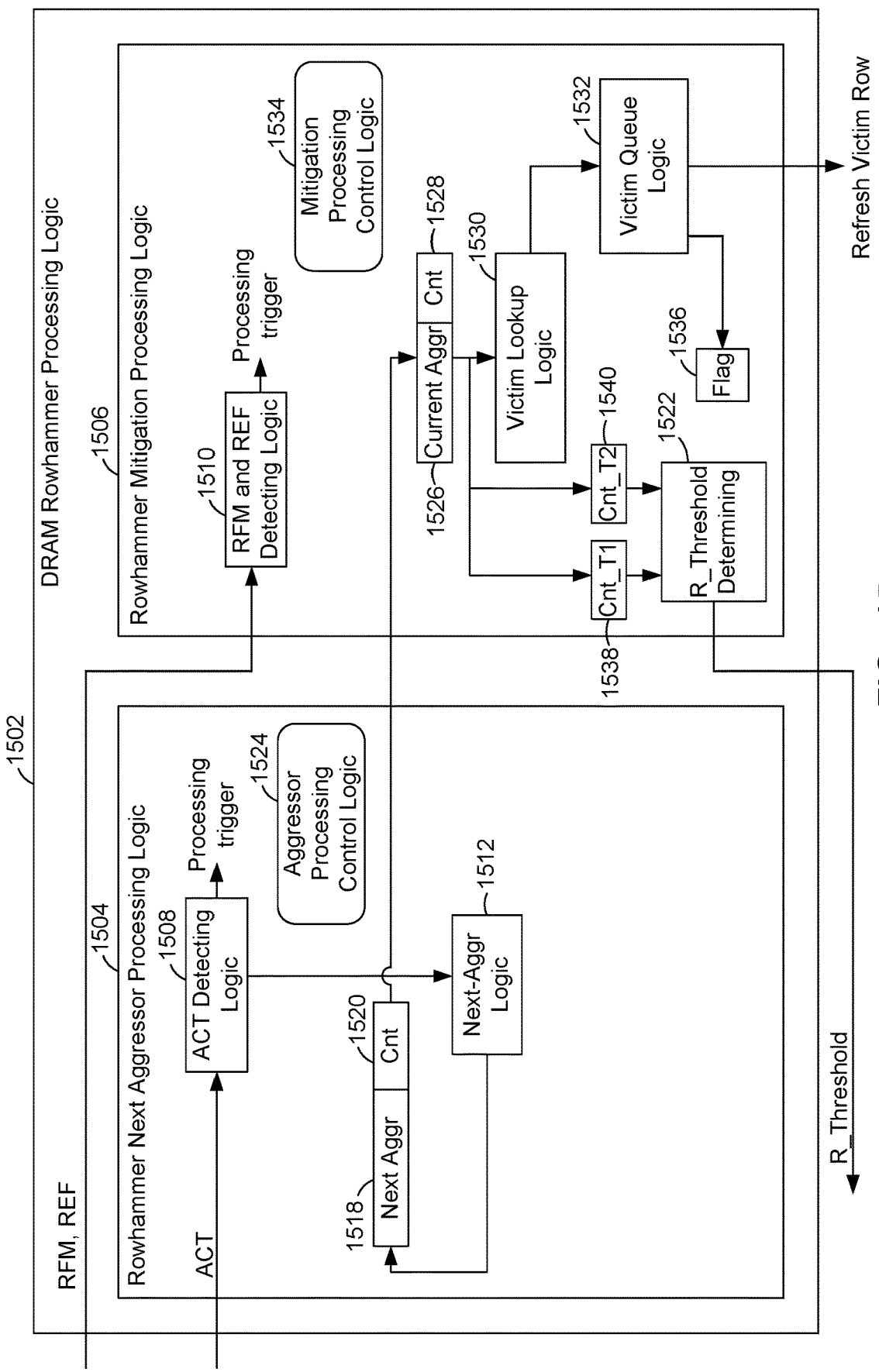
FIG. 15 is a block diagram of yet another system for per-row hammer tracking in a DRAM, in accordance with exemplary embodiments.

In FIG. 15, DRAM rowhammer processing circuitry/logic 1502 is illustrated in block diagram form. The DRAM rowhammer processing logic 1502 may be yet another example of the above-described DRAM rowhammer mitigation processing logic 228 (FIG. 2). The DRAM rowhammer processing logic 1502 may be similar to the DRAM rowhammer processing logic 402 described above with regard to FIG. 4, except that the DRAM rowhammer processing logic 1502 may determine the activation count threshold (R_Threshold) based on most-recent aggressor rows, whereas the DRAM rowhammer processing logic 402 (FIG. 4) may, as described above, determine the activation count threshold using a bucket-based method or other method.

The DRAM rowhammer processing logic 1502 may include rowhammer next aggressor processing circuitry/logic 1504 and rowhammer mitigation processing circuitry/logic 1506. The rowhammer next aggressor processing logic 1504 may include activation command detecting circuitry/logic 1508 configured to monitor for, and to detect, activation commands that the DRAM receives from the memory controller. As in other embodiments described above, such activation command detections may serve as triggers for further actions in the rowhammer next aggressor processing logic 1504. The rowhammer mitigation processing logic 1506 may include refresh command detecting circuitry/logic 1510 configured to monitor for, and to detect, both mitigative refresh commands (RFM) and periodically scheduled refresh commands (REF) that the DRAM receives from the memory controller. As in other embodiments described above, such refresh command detections may serve as triggers for further actions in the rowhammer mitigation processing logic 1506.

The rowhammer next aggressor processing logic 1504 may include, in addition to the above-described activation command detecting logic 1508, next-aggressor circuitry/logic 1512. The next-aggressor logic 1512 may, based on detections of row activation commands by the activation command detecting logic 1508, identify the row to which the greatest number of row activation commands have been directed.

The rowhammer next aggressor processing logic 1504 may further include a next aggressor buffer or register 1518 and associated next aggressor count buffer or register 1520. Similarly to other embodiments described above, the next aggressor register 1518 may be configured to store information identifying the row to which the greatest number of row activation commands have been directed, and the next aggressor count register 420 may be configured to store that number.

The rowhammer next aggressor processing logic 1504 may still further include aggressor processing control circuitry/logic 1524, configured to control aspects of the operation of the foregoing circuitry/logic elements of the rowhammer next aggressor processing logic 1504. For purposes of clarity, some processing flow connections, signaling connections, and other interconnections among the foregoing elements of the rowhammer next aggressor processing logic 1504 are not shown.

The rowhammer mitigation processing logic 1506 may include, in addition to the above-described refresh command detecting logic 1510, a current aggressor buffer or register 1526 and an associated current aggressor count buffer or register 1528. Based upon conditions described below, the value stored in the next aggressor register 1518 may be copied into the current aggressor register 1526, and the value stored in the next aggressor count register 1520 may be copied into the current aggressor count register 1528.

The rowhammer mitigation processing logic 1506 may include victim lookup circuitry/logic 1530. In response to information identifying a current aggressor row provided by the current aggressor register 1526, the victim lookup logic 1530 may be configured to provide information identifying one or more rows that are adjacent to that current aggressor row and therefore potential victims of the current aggressor row.

The rowhammer mitigation processing logic 1506 may include victim queue logic 1532 configured to store information identifying one or more victim rows that have been determined by the victim lookup logic 1530. The stored information may be used to determine which rows to refresh.

The rowhammer mitigation processing logic 1506 may still further include mitigation processing control circuitry/logic 1534, configured to control aspects of the operation of the foregoing circuitry/logic elements of the rowhammer mitigation processing logic 1506. For purposes of clarity, some processing flow connections, signaling connections, and other interconnections among the foregoing elements of the rowhammer mitigation processing logic 1506 are not shown. A flag (e.g., register) 1536 that is used in an exemplary method described below is shown.

The rowhammer mitigation processing logic 1506 may also include activation count threshold (R_Threshold) determining circuitry/logic 1522, first count threshold register circuitry/logic 1538 configured to store a first count (Cnt_T1), and second count threshold register circuitry/logic 1540 configured to store a second count (Cnt_T2). The activation count threshold determining logic 1522 may be configured to operate in a manner described below to determine, based on the first count and the second count, a value of the activation count threshold to provide to the memory controller. Except for the operation of the activation count threshold determining logic 1522 and associated count threshold register logic 1538 and 1540, the DRAM rowhammer processing logic 1502 may operate and otherwise be configured in a manner similar to the above-described DRAM rowhammer processing logic 402 (FIG. 4).

Figure 16:
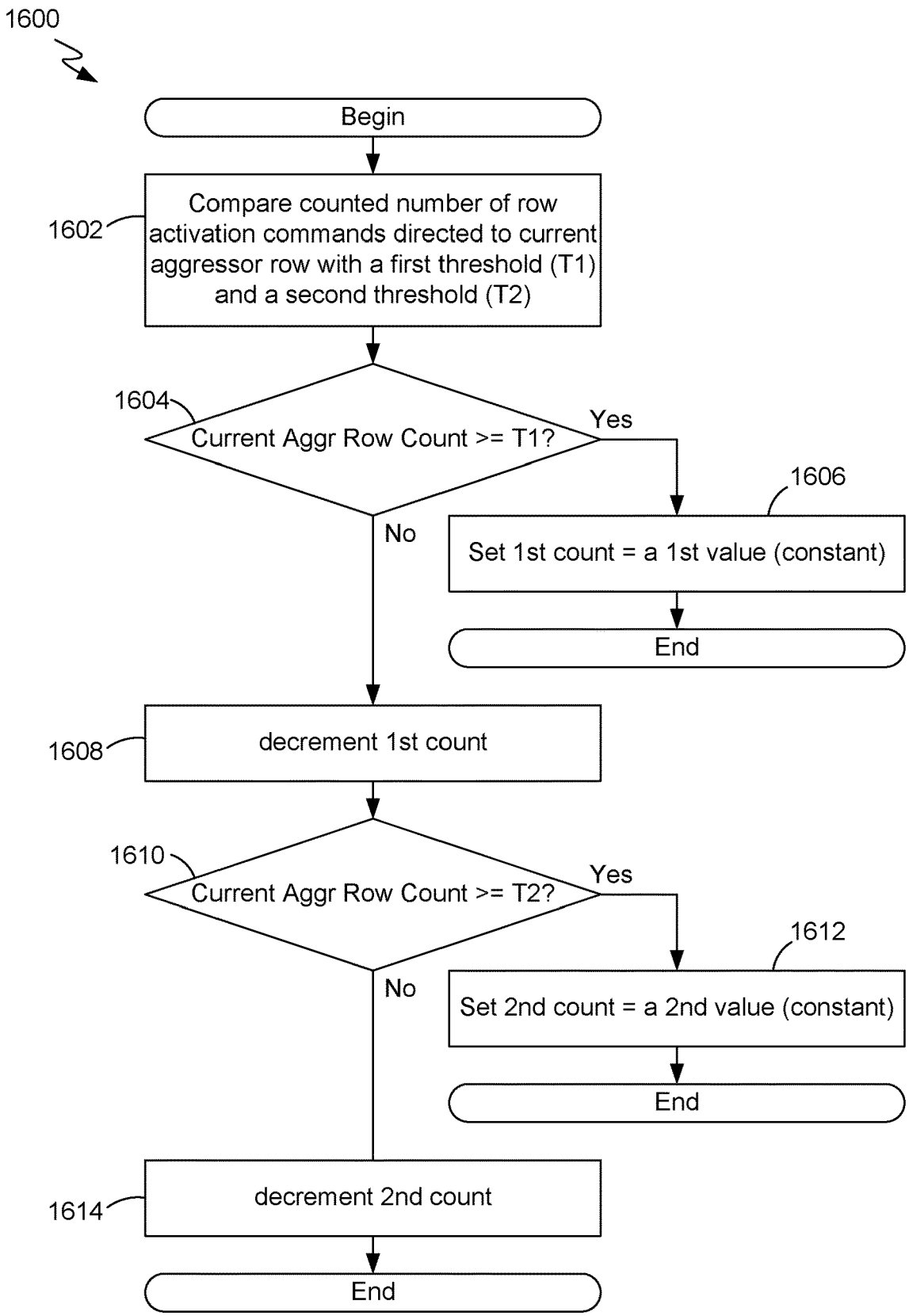
FIG. 16 is a flow diagram illustrating yet another method for per-row hammer tracking in a DRAM, in accordance with exemplary embodiments.

In FIG. 16, a method 1600 relating to the operation of the count threshold register logic 1538 and 1540 (FIG. 15) is illustrated in flow diagram form. The method 1600 may be performed each time the current aggressor row 1526 (FIG. 15) and corresponding count 1528 are updated with the next aggressor row 1518 and corresponding count 1520, respectively. The count threshold register logic 1538 and 1540 may include, in addition to registers for storing the respective first and second counts (Cnt_T1 and Cnt_T2), control logic for controlling the method 1600 or a portion thereof. Alternatively, or in addition, the mitigation processing control logic 1534 may control the method 1600 or a portion thereof. The method 1600 (FIG. 16) and the method 1700 (FIG. 17) may together represent a method for determining a value of the activation count threshold (R_Threshold) based on a history of change in the number of row activation commands that have been directed to the current aggressor row.

As indicated by block 1602, the counted number of row activation commands that have been directed to the current aggressor row (e.g., as indicated by the contents of the current aggressor row count 1528 in FIG. 15) may be compared with a first threshold (T1) and with a second threshold (T2). If it is determined (block 1604) that the number of row activation commands that have been directed to the current aggressor row is greater than or equal to the first threshold, then the first count (Cnt_T1) may be set to a first value (i.e., a fixed value or constant), as indicated by block 1606. However, if it is determined (block 1604) that the number of row activation commands that have been directed to the current aggressor row is not greater than or equal to the first threshold, then the first count (Cnt_T1) may be decremented by one, as indicated by block 1608.

If it is determined (block 1610) that the number of row activation commands that have been directed to the current aggressor row is greater than or equal to the second threshold, then the second count (Cnt_T2) may be set to a second value (i.e., a fixed value or constant), as indicated by block 1612. However, if it is determined (block 1610) that the number of row activation commands that have been directed to the current aggressor row is not greater than or equal to the second threshold, then the second count (Cnt_T2) may be decremented by one, as indicated by block 1614.

Figure 17:
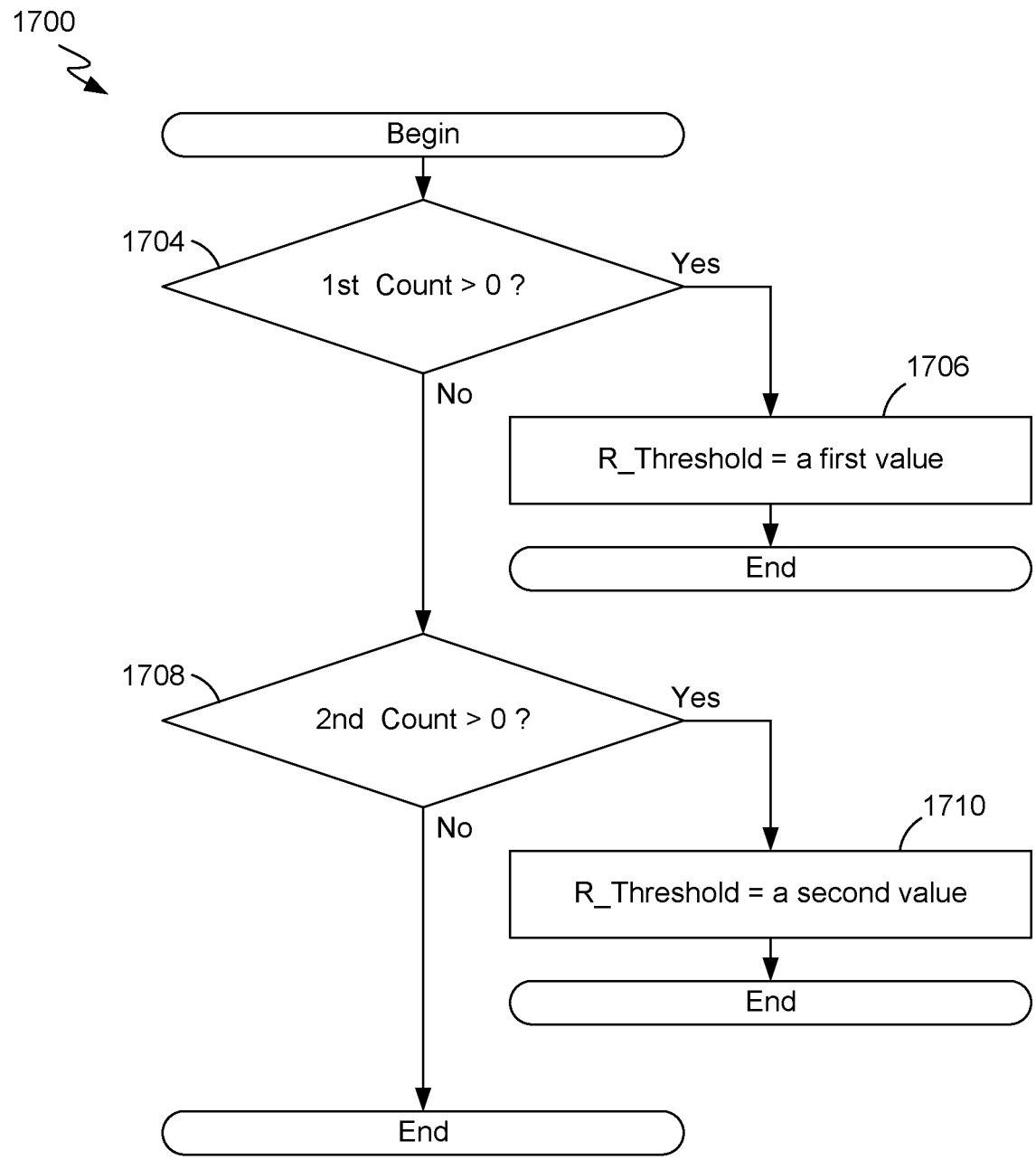
FIG. 17 is a flow diagram illustrating a method for determining an activation count threshold value using counters, in accordance with exemplary embodiments.

In FIG. 17, a method 1700 relating to the operation of the activation count threshold determining logic 1522 (FIG. 15) is illustrated in flow diagram form. If it is determined (block 1704) that the first count (Cnt_T1) is greater than zero, then the activation count threshold (R_Threshold) may be set to a first R_Threshold value (i.e., a fixed value or constant), as indicated by block 1706. If it is determined (block 1708) that the second count (Cnt_T2) is greater than zero, then the activation count threshold R_Threshold) may be set to a second R_Threshold value (i.e., a fixed value or constant), as indicated by block 1710.

In the foregoing manner, one or more count values may be adjusted based on a comparison of the number of row activation commands directed to the current aggressor row with one or more thresholds. The activation command count determining logic 1522 may determine the activation count threshold (R_Threshold) that it provides to the memory controller based on the one or more count values. As described above with regard to the method 1600 (FIG. 16), adjusting the one or more count values may comprise, for example: setting a first count value to a first value when the number of row activation commands directed to the current aggressor row is greater than the first threshold; decrementing the first count value when the number of row activation commands directed to the current aggressor row is not greater than the first threshold; setting a second count value to a second value when the number of row activation commands directed to the current aggressor row is greater than the second threshold; and decrementing the second count value when the number of row activation commands directed to the current aggressor row is not greater than the second threshold.

It should be understood that any of the methods described above for determining the activation count threshold (R_Threshold) may be combined with others. For example, still other methods for determining the activation count threshold could be based on combinations of one or more of:

a history of change in the current aggressor row activation command count (as described above with regard to FIGS. 16-17); a highest count among multiple aggressors (as described above with regard to FIG. 13B); a count of the number of row activation commands "globally" directed to rows in the various banks (as described above with regard to FIG. 10); comparison of the current aggressor row activation command count with one or more thresholds (as described above with regard to FIG. 9); or row activation command count "buckets" (as described above with regard to FIG. 6).

In the above-described examples of DRAM rowhammer processing logic 402 (FIG. 4), 1202 (FIG. 12), and 1502 (FIG. 15), when a next aggressor row is selected (based on criteria relating to the number of row activation commands), the count of the number of activation commands directed to an aggressor row is reset, and a victim row is identified for refreshing (e.g., added to a victim queue). Such operation is also described above with regard to the method 500 (FIG. 5). Alternatively, or in addition, the count of the number of activation commands directed to an aggressor row may be reset during one of the periodically scheduled refresh operations. As understood by one of ordinary skill in the art, the DRAM may receive refresh commands that the memory controller provides on a periodic basis in accordance with a scheduling algorithm. These periodically scheduled refresh commands (REF) are provided to retain the stored data, in contrast with the mitigative refresh commands (RFM) that the memory controller may provide to mitigate the effects of row hammering. In response to such a periodically scheduled refresh command, the DRAM may select a row to refresh. The DRAM may direct such periodic refresh operations to rows in accordance with an order in which the rows are organized, i.e., in a row-by-row sequence. The DRAM may use this order or sequence to determine the next row to refresh, i.e., the next row to which a refresh operation is to be directed when the next periodically scheduled refresh command (REF) is received from the memory controller.

Figure 18:
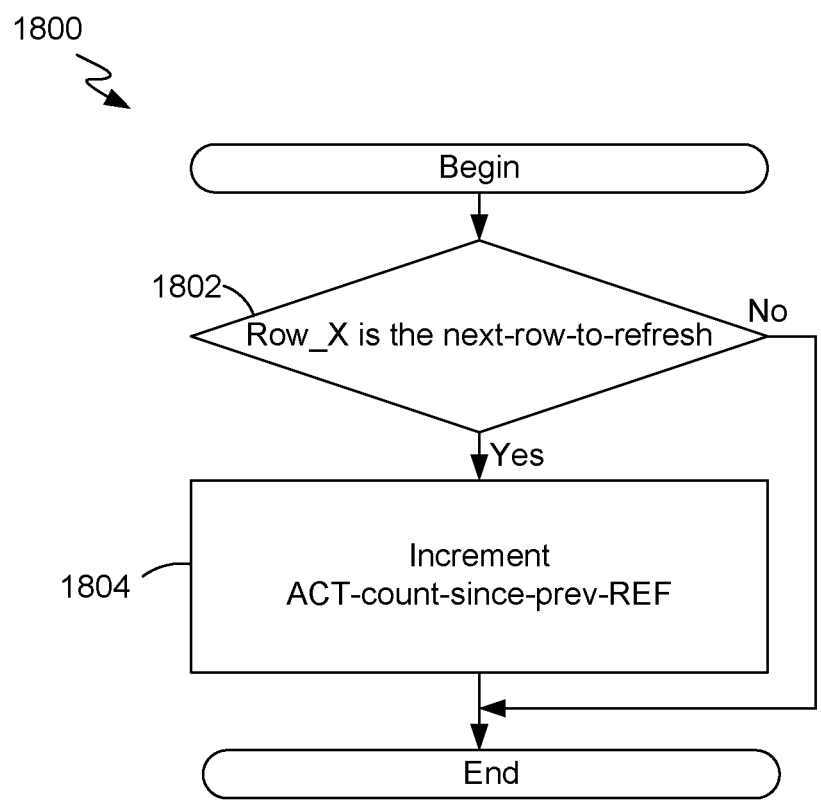
FIG. 18 is a flow diagram illustrating a method for maintaining a count of the number of activation commands since a previous refresh, in accordance with exemplary embodiments.
Figure 19:
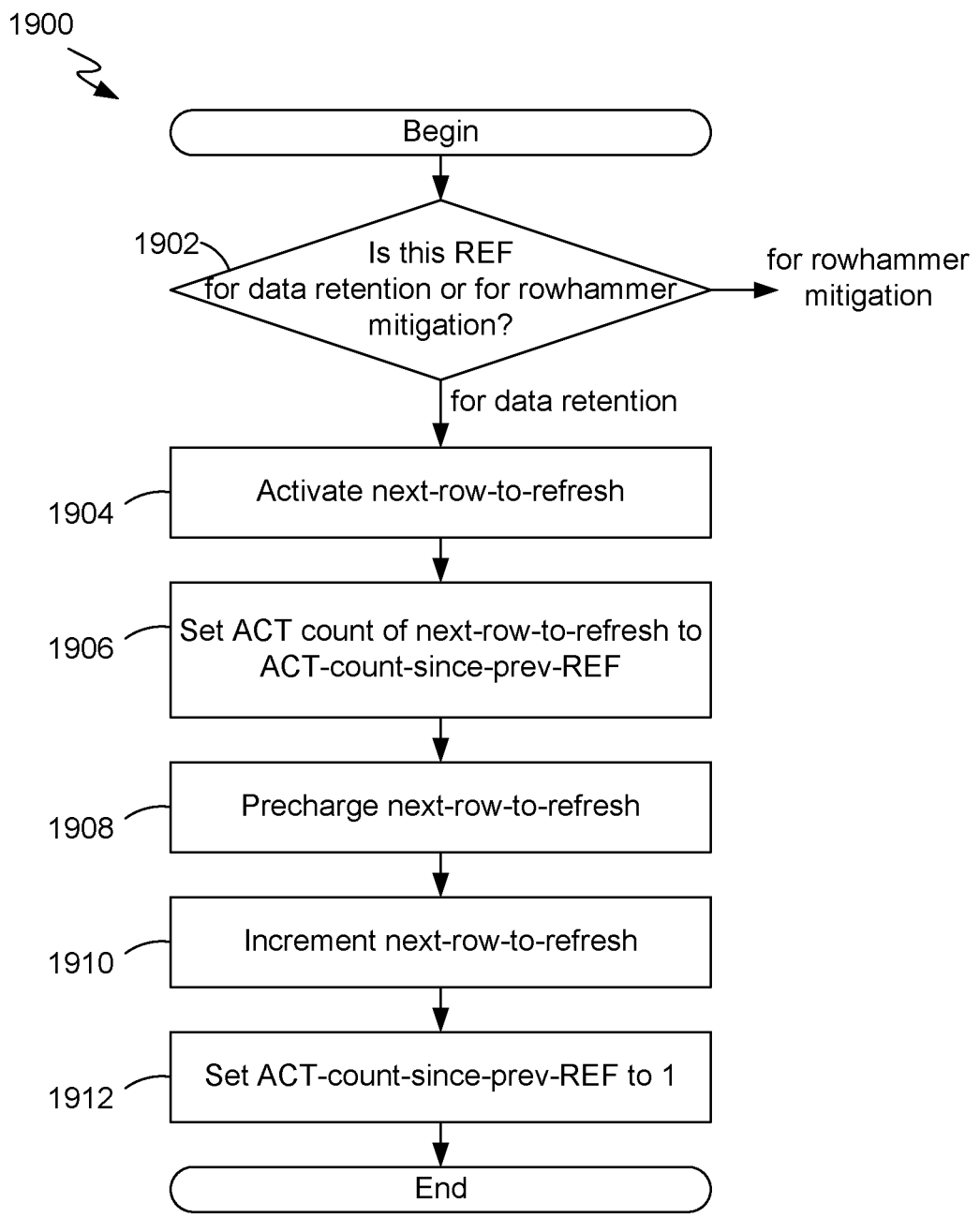
FIG. 19 is a flow diagram illustrating a method for resetting the activation command count of a row that had been the next row to be refreshed, to a value reflecting the number of activation commands since a previous refresh, in accordance with exemplary embodiments.

In FIGS. 18 and 19, methods 1800 and 1900 are shown in flow diagram form that relate to resetting the count of the number of activation commands directed to an aggressor row during a periodically scheduled refresh. The method 1800 may be performed by DRAM rowhammer processing logic that is similar to any of the above-described DRAM rowhammer processing logic 402 (FIG. 4), 1202 (FIG. 12), or 1502 (FIG. 15) except that its activation command counting logic would be configured to store and otherwise keep track of the number of activation commands that have been received since the previous time a refresh command was received ("ACT-count-since-prev-REF"). It may be noted that this feature may address the case in which the next row to refresh is the subject of a rowhammer attack. As indicated by block 1802 of the method 1800, the DRAM may determine whether the row to which a received activation command is directed (Row_X) is the next row to be refreshed. As indicated by block 1804, the DRAM may increment ACT-count-since-prev-REF if it is determined (block 1802) that Row_X is the next row to be refreshed.

The method 1900 (FIG. 19) may be performed by, for example, the DRAM's refresh processing logic 225, described above with regard to FIG. 2. Each received REF command may trigger the performance of the method 1900.

As indicated by block 1902, it may be determined whether a received REF command is to be used for data retention or for rowhammer mitigation. In response to some (or most) of the REF commands that the DRAM receives, the DRAM may direct refresh operations to rows in a manner that primarily promotes data retention. Nevertheless, in at least some examples of the method 1900, it is contemplated that in response to some subset of the received REF commands the DRAM may direct refresh operations to rows that have been deemed victims of row hammering (e.g., read and removed from a victim queue, as described above), in the same manner as if the DRAM had received a mitigative refresh (RFM) command. If the DRAM determines (block 1902) to respond to a received REF command as though it were a RFM command, then the mitigation methods described above, which may include adding victim rows to a victim queue, may be performed (and such response is therefore not shown in FIG. 19).

If, however, the DRAM determines (block 1902) to respond to a received REF command in a manner that primarily promotes data retention, then the remainder of the method 1900, comprising blocks 1904-1912, may be performed. As indicated by block 1904, the next row to refresh may be activated. (As understood by one of ordinary skill in the art, a row must be activated before it can be refreshed.) Then, as indicated by block 1906, the activation command count of the next row to refresh may be reset to the number of activation commands that have been received since the previous time a refresh command was received (ACT-count-since-previous-REF). In referring to the "previous time a refresh command was received, the term "previous" refers to the refresh command preceding the refresh command that triggered performance of the method 1900. Alternatively, the activation command count of the next row to refresh could be reset to a fixed, worst-case value, i.e., the maximum possible number of activation commands that could occur between two consecutive REFs. The next row to refresh may then be precharged, as indicated by block 1908. As indicated by block 1910, the next row to refresh may then be incremented (in accordance with the order or sequence in which rows are refreshed). Then, the value of ACT-count-since-previous-REF may be reset to a count of one, as indicated by block 1912.

In FIG. 20, a timing chart 2000 illustrates an example of operation of the above-described methods 1800 and 1900. For purposes of clarity, the example illustrates only three rows, Row 1, Row 2, and Row 3, but the DRAM could have any number of rows. The example illustrates row activations (ACT), refreshes (REF), and the activation command counts of Rows 1-3 in six successive time windows or intervals: T1, T2, T3, T4, T5, and T6. The time intervals T1-T6 are not shown to scale and may be of any lengths. In the illustrated example, and in accordance with the above-described methods 1800 and 1900, the DRAM's refresh processing logic 225 (FIG. 2) or other such DRAM refresh logic directs refresh operations to Rows 1-3 in sequence. That is, Row 2 will be the next row to be refreshed after Row 1, and Row 3 will be the next row to be refreshed after Row 2.

During the time interval T1, Rows 1-3 each initially have activation command counts of 1000. That is, in the illustrated example, 1000 activation commands have been directed to each of Rows 1-3 between the last time the activation command counts of Row 1-3 were reset and the end of the time interval T1. Later, during the time interval T2, a REF command is received and, in response, a refresh operation is performed on Row 1. In response to the refresh operation on Row 1, the activation command count of Row 1 is reset to a value of one. As no operations have yet been directed to Rows 2 or 3 during the time intervals T1 or T2, the activation command counts of Rows 2 and 3 remain at 1000 at the end of the time interval T2. Also, in the time interval T2 it has been determined that Row 2 is the next row to be refreshed, which is scheduled to occur in the time interval T4. Also in the time interval T2, it has been determined that Row 3 is scheduled to be refreshed in the time interval T6.

In the time interval T3, 500 activation commands are directed to Row 2. As a result of these 500 activation commands, by the end of the time interval T3 the activation command count of Row 2, which had been 1000, has been incremented to 1500. Although not shown in FIG. 20, it should be noted that these 500 activation command directed to Row 2 occur while Row 2 is the next row to be refreshed. Accordingly, the value of ACT-count-since-previous-REF is incremented each time one of these 500 activation commands occurs. Therefore, the 500 activation commands directed to Row 2 in the time interval T3 increment the value of ACT-count-since-previous-REF to 500. As no operations were directed to Rows 1 or 3 during the time interval T3, the activation command counts of Rows 1 and 3 remain at 1 and 1000, respectively, at the end of the time interval T3.

Then, a REF command is received in the time interval T4. The refresh operation is performed on Row 2 in the time interval T4 because, during the preceding time interval T3, Row 2 had been designated as the next row to be refreshed. After this refresh operation is performed on Row 2, the activation command count of Row 2 is reset to the value of ACT-count-since-previous-REF, which is 500. Note that resetting the activation command count of Row 2 to a value of 500 correctly accounts for the victimizing effect of these activations on row 1 which was refreshed during T2. If, instead of resetting the activation command count of Row 2 to a value of 500 it were reset to a value of one, the victimizing effect of those 500 activations on adjacent Row 1 would go uncounted. As no operations were directed to Rows 1 or 3 between in the time interval T4, the activation command counts of Rows 1 and 3 remain at 1 and 1000, respectively, at the end of the time interval T4.

In the time interval T5, 250 activation commands are directed to Row 2, and 250 activation commands are directed to Row 3. Accordingly, by the end of the time interval T5 the activation command count of Row 2, which had been 500, has been incremented to 750, and the activation command count of Row 3, which had been 1000, has been incremented to 1250. As no operations have been directed to Row 1 in the time interval T5, the activation command count of Row 1 remains at 1 at the end of the time interval T5. Although not shown in FIG. 20, it should be noted that the 250 activation command directed to Row 3 occur while Row 3 is the next row to be refreshed. Accordingly, the value of ACT-count-since-previous-REF is incremented each time one of these 500 activation commands occurs. Also, although not shown in FIG. 20, it should be noted that during the time that Row 3 remains the next row to be refreshed, the value of ACT-count-since-previous-REF is incremented each time an activation command is directed to Row 3. Therefore, the 250 activation commands directed to Row 3 in the time interval T5 increment the value of ACT-count-since-previous-REF to 250.

Then, a REF command is received in the time interval T6. The refresh operation is performed on Row 3 in the time interval T6 because, during the preceding time interval T5, Row 3 had been designated as the next row to be refreshed. After this refresh operation is performed on Row 3, the activation command count of Row 3 is reset to the value of ACT-count-since-previous-REF, which is 250. As no operations have been directed to Rows 1 or 2 in the time interval T6, the activation command counts of Rows 1 and 2 remain at 1 and 750, respectively, at the end of the time interval T6.

Figure 21:
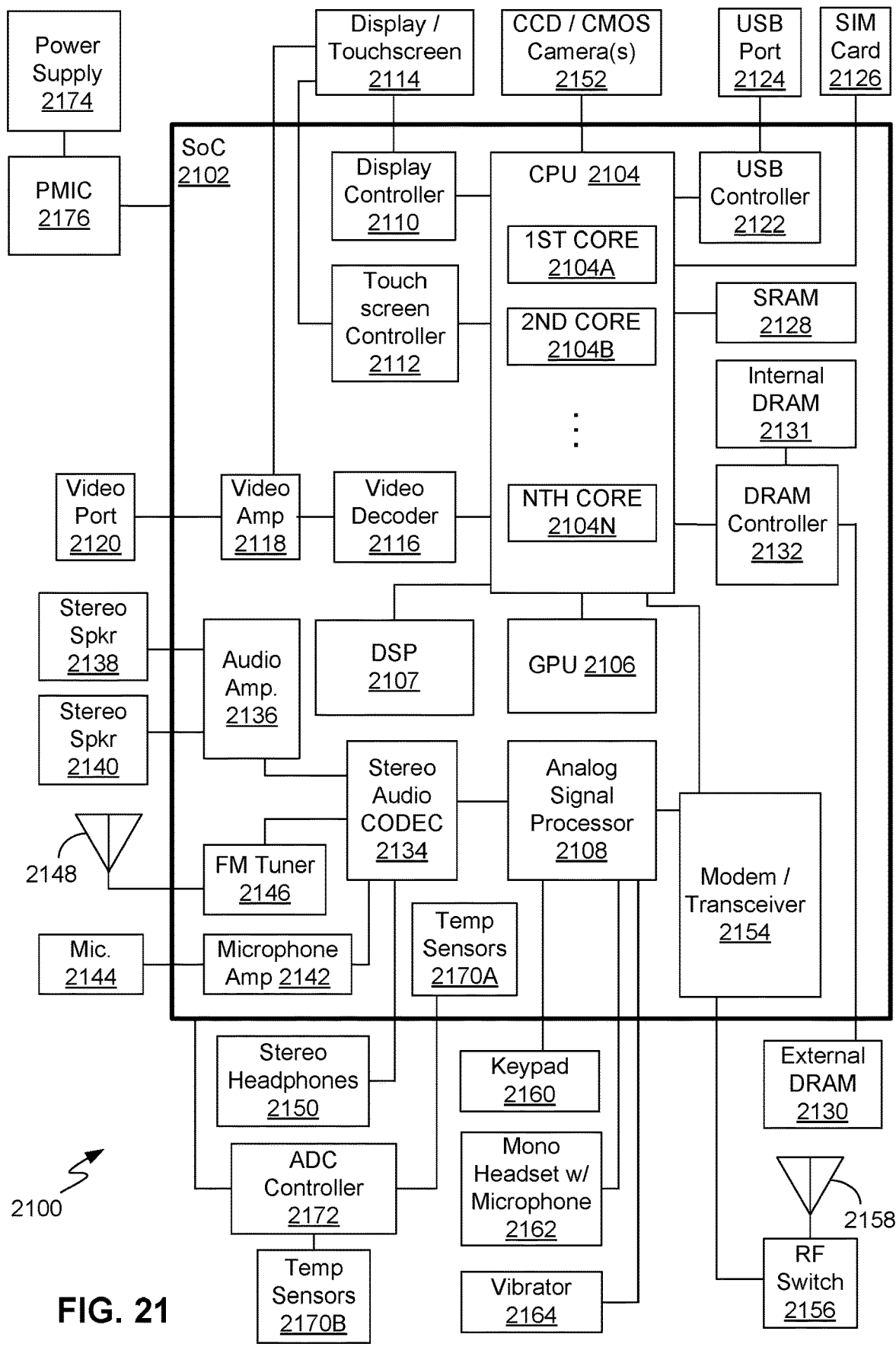
FIG. 21 is a block diagram of a computing device, in accordance with exemplary embodiments.

FIG. 21 illustrates an example of a portable computing device ("PCD") 2100, in which exemplary embodiments of systems, methods and other examples of rowhammer mitigation solutions may be provided. The PCD 2100 may be, for example, a laptop or palmtop computer, cellular telephone or smartphone, personal digital assistant, navigation device, smartbook, portable game console, satellite telephone, etc. For purposes of clarity, some data buses, interconnects, signals, etc., are not shown in FIG. 21. The PCD 2100 is only one example of a computing device in which the rowhammer mitigation solutions may be provided. The rowhammer mitigation solutions may be provided in any type of computing device having a DRAM memory system, such as a desktop computer, workstation, datacenter computing system, Internet of Things device, etc.

The PCD 2100 may include an SoC 2102. The SoC 2102 may include a central processing unit ("CPU") 2104, a graphics processing unit ("GPU") 2106, a digital signal processor ("DSP") 2107, an analog signal processor 2108, a modem/modem subsystem 2154, or other processors. The CPU 2104 may include one or more CPU cores, such as a first CPU core 2104A, a second CPU core 2104B, etc., through an Nth CPU core 2104N.

A display controller 2110 and a touch-screen controller 2112 may be coupled to the CPU 2104. A touchscreen display 2114 external to the SoC 2102 may be coupled to the display controller 2110 and the touch-screen controller 2112. The PCD 2100 may further include a video decoder 2116 coupled to the CPU 2104. A video amplifier 2118 may be coupled to the video decoder 2116 and the touchscreen display 2114. A video port 2120 may be coupled to the video amplifier 2118. A universal serial bus ("USB") controller 2122 may also be coupled to CPU 2104, and a USB port 2124 may be coupled to the USB controller 2122. A subscriber identity module ("SIM") card 2126 may also be coupled to the CPU 2104.

One or more memories may be coupled to the CPU 2104. The one or more memories may include both volatile and non-volatile memories. Examples of volatile memories include static random access memory ("SRAM") 2128 and DRAMs 2130 and 2131. Such memories may be external to the SoC 2102, such as the DRAM 2130, or internal to the SoC 2102, such as the DRAM 2131. A DRAM controller 2132 coupled to the CPU 2104 may control the writing of data to, and reading of data from, the DRAMs 2130 and 2131. Either or both of the DRAMs 2130 and 2131 may be an example of the DRAM device 208 described above with regard to FIG. 2. The DRAM controller 2132 may be an example of the memory controller 206 described above with regard to FIG. 2.

A stereo audio CODEC 2134 may be coupled to the analog signal processor 2108. Further, an audio amplifier 2136 may be coupled to the stereo audio CODEC 2134. First and second stereo speakers 2138 and 2140, respectively, may be coupled to the audio amplifier 2136. In addition, a microphone amplifier 2142 may be coupled to the stereo audio CODEC 2134, and a microphone 2144 may be coupled to the microphone amplifier 2142. A frequency modulation ("FM") radio tuner 2146 may be coupled to the stereo audio CODEC 2134. An FM antenna 2148 may be coupled to the FM radio tuner 2146. Further, stereo headphones 2150 may be coupled to the stereo audio CODEC 2134. Other devices that may be coupled to the CPU 2104 include one or more digital (e.g., CCD or CMOS) cameras 2152.

The modem or RF transceiver 2154 may be coupled to the analog signal processor 2108 and the CPU 2104. An RF switch 2156 may be coupled to the RF transceiver 2154 and an RF antenna 2158. In addition, a keypad 2160, a mono headset with a microphone 2162, and a vibrator device 2164 may be coupled to the analog signal processor 2108.

The SoC 2102 may have one or more internal or on-chip thermal sensors 2170A and may be coupled to one or more external or off-chip thermal sensors 2170B. An analog-to-digital converter controller 2172 may convert voltage drops produced by the thermal sensors 2170A and 2170B to digital signals. A power supply 2174 and a power management integrated circuit ("PMIC") 2176 may supply power to the SoC 2102.

Firmware or software may be stored in any of the above-described memories, such as the DRAM 2130 or 2131, SRAM 2128, etc., or may be stored in a local memory directly accessible by the processor hardware (circuitry/logic) on which the software or firmware executes. Execution of such firmware or software may control aspects of any of the above-described methods or configure aspects of any of the above-described systems or circuitry/logic. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for per-row hammer tracking in a DRAM device, comprising:
    counting, by the DRAM device, a number of row activation commands directed to each row of a bank of the DRAM device;
    determining, by the DRAM device, a next aggressor row based on the number of row activation commands;
    updating a current aggressor row with the next aggressor row based on detection of a refresh command directed to the bank and a determination the victim queue is empty; and
    resetting, following updating the current aggressor row, a count of the number of row activation commands directed to the next aggressor row.

2. The method of clause 1, further comprising:
    determining, by the DRAM device based on detection of a refresh command directed to the bank, whether a victim queue is empty; and
    refreshing a row in the victim queue based on detection of a refresh command directed to the bank and a determination the victim queue is not empty.

3. The method of clause 1 or 2, further comprising adding a victim row corresponding to the current aggressor row to the victim queue based on detection of a refresh command directed to the bank and a determination the victim queue is empty.

4. The method of any of clauses 1-3, further comprising:
    determining, by the DRAM device, an activation count threshold value based on a comparison of the number of row activation commands directed to the current aggressor row with at least one threshold value; and
    providing, by the DRAM, the activation count threshold value to a memory controller.

5. The method of any of clauses 1-3, further comprising:
    counting, by the DRAM device, a number of row activation commands directed to rows in one or more banks of the DRAM device;
    determining, by the DRAM device, an activation count threshold value based on a comparison of the number of row activation commands directed to the rows in the one or more banks with at least one threshold value; and
    providing, by the DRAM, the activation count threshold value to a memory controller.

6. The method of any of clauses 1-5, further comprising:
    comparing, in response to a row activation command directed to a row, the number of row activation commands directed to the row with the number of row activation commands directed to the next aggressor row, wherein determining the next aggressor row comprises updating the next aggressor row with the row when the number of row activation commands directed to the row is greater than the number of row activation commands directed to the next aggressor row; and
    resetting, in response to the row activation command directed to the row, a count of the number of row activation commands directed to the current aggressor row when the current aggressor row was updated with the next aggressor row after a refresh command preceding the row activation command directed to the row.

7. The method of any of clauses 1-6, further comprising:
    determining, by the DRAM device, a number of rows in each of a plurality of buckets, including, for each bucket, counting a number of rows having a number of row activation commands directed thereto greater than or equal to a corresponding bucket activation count threshold of the bucket, wherein each bucket has a corresponding bucket activation count threshold different from all other buckets and a corresponding bucket threshold different from all other buckets;
    selecting, by the DRAM device, from among a subset of the buckets having non-zero numbers of rows therein, one of the buckets having a greatest bucket activation count threshold;
    providing, by the DRAM device, an activation count threshold value to a memory controller based on the bucket threshold of a selected one of the buckets; and
    before resetting the count of the number of row activation commands directed to the current aggressor row, decrementing a row count of each bucket having the current aggressor row therein by the number of row activation commands directed to the current aggressor row.

8. The method of any of clauses 1-7, wherein:
    determining the next aggressor row comprises, in response to a row activation command directed to a row, adding the row to an aggressor queue in place of a lowest-count row when the row is not in the aggressor queue and the number of row activation commands directed to the row is greater than the number of row activation commands directed to the lowest-count row, wherein the number of row activation commands directed to the lowest-count row is less than the number of row activation commands directed to all other rows in the aggressor queue, and determining the next aggressor row further comprises selecting a highest-count row in the aggressor queue, wherein the number of row activation commands directed to the highest-count row is greater than the number of row activation commands directed to all other rows in the aggressor queue; and
    updating the current aggressor row with the next aggressor row comprises selecting the highest-count row.

9. The method of clause 8, further comprising providing, by the DRAM device, an activation count threshold value to a memory controller based on the number of row activation commands directed to the highest-count row.

10. The method of clause 8 or 9, further comprising providing, by the DRAM device, an alert signal to a memory controller when the number of row activation commands directed to the highest-count row is greater than a threshold.

11. The method of any of clauses 1-10, wherein:
after updating the current aggressor row with the next aggressor row, comparing the number of row activation commands directed to the current aggressor row with at least one threshold;
adjusting at least one count value based on a comparison of the number of row activation commands directed to the current aggressor row with the at least one threshold; and
providing, by the DRAM device, an activation count threshold value to a memory controller based on the at least one count value.

12. The method of clause 11, wherein:
comparing the number of row activation commands directed to the current aggressor row with at least one threshold comprises comparing the number of row activation commands directed to the current aggressor row with a first threshold and a second threshold;
adjusting at least one count value based on a comparison of the number of row activation commands directed to the current aggressor row with the at least one threshold comprises setting a first count value to a first value when the number of row activation commands directed to the current aggressor row is greater than the first threshold, decrementing the first count value when the number of row activation commands directed to the current aggressor row is not greater than the first threshold, setting a second count value to a second value when the number of row activation commands directed to the current aggressor row is greater than the second threshold, and decrementing the second count value when the number of row activation commands directed to the current aggressor row is not greater than the second threshold; and
providing the activation count threshold value comprises selecting the activation count threshold value based on the first count value and the second count value.

13. The method of any of clauses 1-12, further comprising:
scheduling, by the DRAM device, a next row to refresh;
detecting, by the DRAM device, periodically scheduled refresh commands from a memory controller;
counting a number of row activation commands since a preceding periodically scheduled refresh command;
setting, in response to a periodically scheduled refresh command, a count of the number of row activation commands directed to the next row to refresh to the number of row activation commands since a preceding periodically scheduled refresh command;
after setting the count to the number of row activation commands since a preceding periodically scheduled refresh command, refreshing the next row to be refreshed in response to a next periodically scheduled refresh command; and
after refreshing the next row to be refreshed, resetting the number of row activation commands since a preceding periodically scheduled refresh command to one.

14. A system for per-row hammer tracking in a DRAM device, comprising:
aggressor processing circuitry configured to count a number of row activation commands directed to each row of a bank of the DRAM device and configured to determine a next aggressor row based on the number of row activation commands; and
mitigation processing circuitry configured to determine, based on detection of a refresh command directed to the bank, whether a victim queue is empty and configured to initiate refreshing a row in the victim queue based on detection of a refresh command directed to the bank and a determination the victim queue is not empty;
wherein the mitigation processing circuitry is further configured to update a current aggressor row with the next aggressor row based on detection of a refresh command directed to the bank.

15. The system of clause 14, wherein the mitigation processing circuitry is configured to update a current aggressor row with the next aggressor row further based on a determination the victim queue is empty.

16. The system of clause 14 or 15, wherein the mitigation processing circuitry is further configured to add a victim row corresponding to the current aggressor row to the victim queue based on detection of a refresh command directed to the bank and a determination the victim queue is empty.

17. The system of any of clauses 14-16, wherein the aggressor processing circuitry is further configured to:
determine an activation count threshold value based on a comparison of the number of row activation commands directed to the current aggressor row with at least one threshold value; and
provide the activation count threshold value to a memory controller.

18. The system of any of clauses 14-17, wherein the aggressor processing circuitry is further configured to:
count a number of row activation commands directed to rows in one or more banks of the DRAM device;
determine an activation count threshold value based on a comparison of the number of row activation commands directed to the rows in the one or more banks with at least one threshold value; and
provide the activation count threshold value to a memory controller.

19. The system of any of clauses 14-18, wherein the aggressor processing circuitry is further configured to:
compare, in response to a row activation command directed to a row, the number of row activation commands directed to the row with the number of row activation commands directed to the next aggressor row, wherein the aggressor processing circuitry being configured to determine the next aggressor row includes being configured to update the next aggressor row with the row when the number of row activation commands directed to the row is greater than the number of row activation commands directed to the next aggressor row; and
reset, in response to the row activation command directed to the row, a count of the number of row activation commands directed to the current aggressor row when the current aggressor row was updated with the next aggressor row after a refresh command preceding the row activation command directed to the row.

20. The system of any of clauses 14-19, wherein the aggressor processing circuitry is further configured to:
determine a number of rows in each of a plurality of buckets, including, for each bucket, count a number of rows having a number of row activation commands directed thereto greater than or equal to a corresponding bucket activation count threshold of the bucket, wherein each bucket has a corresponding bucket activation count threshold different from all other buckets and a corresponding bucket threshold different from all other buckets;
select, from among a subset of the buckets having non-zero numbers of rows therein, one of the buckets having a greatest bucket activation count threshold;
provide an activation count threshold value to a memory controller based on the bucket threshold of a selected one of the buckets; and
before the count of the number of row activation commands directed to the current aggressor row is reset, decrement a row count of each bucket having the current aggressor row therein by the number of row activation commands directed to the current aggressor row.

21. The system of any of clauses 14-20, wherein the aggressor processing circuitry is further configured to:
in response to a row activation command directed to a row, add the row to an aggressor queue in place of a lowest-count row when the row is not in the aggressor queue and the number of row activation commands directed to the row is greater than the number of row activation commands directed to the lowest-count row, wherein the number of row activation commands directed to the lowest-count row is less than the number of row activation commands directed to all other rows in the aggressor queue, and determining the next aggressor row further comprises selecting a highest-count row in the aggressor queue, wherein the number of row activation commands directed to the highest-count row is greater than the number of row activation commands directed to all other rows in the aggressor queue; and
update the current aggressor row with the next aggressor row comprises selecting the highest-count row.

22. The system of clause 21, wherein the aggressor processing circuitry is further configured to provide an activation count threshold value to a memory controller based on the number of row activation commands directed to the highest-count row.

23. The system of clause 21 or 22, wherein the aggressor processing circuitry is further configured to provide an alert signal to a memory controller when the number of row activation commands directed to the highest-count row is greater than a threshold.

24. The system of any of clauses 14-23, wherein the mitigation processing circuitry is further configured to:
after the current aggressor row is updated with the next aggressor row, compare the number of row activation commands directed to the current aggressor row with at least one threshold;
adjust at least one count value based on a comparison of the number of row activation commands directed to the current aggressor row with the at least one threshold; and
provide an activation count threshold value to a memory controller based on the at least one count value.

25. The system of clause 24, wherein the mitigation processing circuitry is further configured to:
compare the number of row activation commands directed to the current aggressor row with a first threshold and a second threshold;
set a first count value to a first value when the number of row activation commands directed to the current aggressor row is greater than the first threshold, decrementing the first count value when the number of row activation commands directed to the current aggressor row is not greater than the first threshold;
set a second count value to a second value when the number of row activation commands directed to the current aggressor row is greater than the second threshold;
decrement the second count value when the number of row activation commands directed to the current aggressor row is not greater than the second threshold; and
select the activation count threshold value based on the first count value and the second count value.

26. The system of any of clauses 14-25, further comprising refresh processing circuitry configured to:
schedule a next row to refresh;
detect periodically scheduled refresh commands from a memory controller;
count a number of row activation commands since a preceding periodically scheduled refresh command;
set, in response to a periodically scheduled refresh command, a count of the number of row activation commands directed to the next row to refresh to the number of row activation commands since a preceding periodically scheduled refresh command;
after the count is set to the number of row activation commands since a preceding periodically scheduled refresh command, refresh the next row to be refreshed in response to a next periodically scheduled refresh command; and
after the next row to be refreshed is refreshed, reset the number of row activation commands since a preceding periodically scheduled refresh command to one.

27. A system for per-row hammer tracking in a DRAM device, comprising:
means for counting a number of row activation commands directed to each row of a bank of the DRAM device;
means for determining a next aggressor row based on the number of row activation commands;
means for updating a current aggressor row with the next aggressor row based on detection of a refresh command directed to the bank; and
means for resetting, following updating the current aggressor row, a count of the number of row activation commands directed to the next aggressor row.

28. The system of clause 27, further comprising:
means for determining, based on detection of a refresh command directed to the bank, whether a victim queue is empty;
means for refreshing a row in the victim queue based on detection of a refresh command directed to the bank and a determination the victim queue is not empty; and
means for updating a current aggressor row with the next aggressor row based on detection of a refresh command directed to the bank and a determination the victim queue is empty.

29. The system of clause 27 or 28, further comprising means for adding a victim row corresponding to the current aggressor row to the victim queue based on detection of a refresh command directed to the bank and a determination the victim queue is empty.

30. A dynamic random access memory (DRAM) device, comprising:
at least one data storage array comprising a plurality of rows;
refresh processing circuitry configured to direct refresh operations to the data storage array; and row hammering processing circuitry, comprising aggressor processing circuitry and mitigation processing circuitry;

wherein the aggressor processing circuitry is configured to count a number of row activation commands directed to each row of a bank of the DRAM device and configured to determine a next aggressor row based on the number of row activation commands;

wherein the mitigation processing circuitry is further configured to update a current aggressor row with the next aggressor row based on detection of a refresh command directed to the bank; and wherein the aggressor processing circuitry is further configured to reset, following the updating of the current aggressor row, a count of the number of row activation commands directed to the next aggressor row.

31. The DRAM device of clause 30, wherein the mitigation processing circuitry is configured to determine, based on detection of a refresh command directed to the bank, whether a victim queue is empty and configured to initiate refreshing a row in the victim queue based on detection of a refresh command directed to the bank and a determination the victim queue is not empty.

32. The DRAM device of clause 30 or 31, wherein the mitigation processing circuitry is further configured to add a victim row corresponding to the current aggressor row to the victim queue based on detection of a refresh command directed to the bank and a determination the victim queue is empty.

33. The DRAM device of any of clauses 30-32, wherein the aggressor processing circuitry is further configured to:
   determine an activation count threshold value based on a comparison of the number of row activation commands directed to the current aggressor row with at least one threshold value; and
   provide the activation count threshold value to a memory controller.

34. The DRAM device of any of clauses 30-33, wherein the aggressor processing circuitry is further configured to:
   count a number of row activation commands directed to rows in one or more banks of the DRAM device;
   determine an activation count threshold value based on a comparison of the number of row activation commands directed to the rows in the one or more banks with at least one threshold value; and
   provide the activation count threshold value to a memory controller.

35. The DRAM device of any of clauses 30-34, wherein the aggressor processing circuitry is further configured to:
   compare, in response to a row activation command directed to a row, the number of row activation commands directed to the row with the number of row activation commands directed to the next aggressor row, wherein the aggressor processing circuitry being configured to determine the next aggressor row includes being configured to update the next aggressor row with the row when the number of row activation commands directed to the row is greater than the number of row activation commands directed to the next aggressor row; and
   reset, in response to the row activation command directed to the row, a count of the number of row activation commands directed to the current aggressor row when the current aggressor row was updated with the next aggressor row after a refresh command preceding the row activation command directed to the row.

36. The DRAM device of any of clauses 30-35, wherein the aggressor processing circuitry is further configured to:
   in response to a row activation command directed to a row, add the row to an aggressor queue in place of a lowest-count row when the row is not in the aggressor queue and the number of row activation commands directed to the row is greater than the number of row activation commands directed to the lowest-count row, wherein the number of row activation commands directed to the lowest-count row is less than the number of row activation commands directed to all other rows in the aggressor queue, and determining the next aggressor row further comprises selecting a highest-count row in the aggressor queue, wherein the number of row activation commands directed to the highest-count row is greater than the number of row activation commands directed to all other rows in the aggressor queue;
   update the current aggressor row with the next aggressor row, including to select the highest-count row; and
   provide an activation count threshold value to a memory controller based on the number of row activation commands directed to the highest-count row.

37. The DRAM device of any of clauses 30-36, wherein the mitigation processing circuitry is further configured to:
   after the current aggressor row is updated with the next aggressor row, compare the number of row activation commands directed to the current aggressor row with at least one threshold;
   adjust at least one count value based on a comparison of the number of row activation commands directed to the current aggressor row with the at least one threshold; and
   provide an activation count threshold value to a memory controller based on the at least one count value.

38. The DRAM device of any of clauses 30-37, wherein the refresh processing logic is configured to:
   schedule a next row to refresh;
   detect periodically scheduled refresh commands from a memory controller;
   count a number of row activation commands since a preceding periodically scheduled refresh command;
   set, in response to a periodically scheduled refresh command, a count of the number of row activation commands directed to the next row to refresh to the number of row activation commands since a preceding periodically scheduled refresh command;
   after the count is set to the number of row activation commands since a preceding periodically scheduled refresh command, refresh the next row to be refreshed in response to a next periodically scheduled refresh command; and
   after the next row to be refreshed is refreshed, reset the number of row activation commands since a preceding periodically scheduled refresh command to one.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for per-row hammer tracking in a DRAM device, comprising:
   monitoring or detecting, by an activation command (ACT) detecting circuitry of the DRAM device, a number of row activation commands directed to each row of a bank of the DRAM device;

determining, by a next aggressor row circuitry of the DRAM device, a next aggressor row based on the number of row activation commands;

storing in a next aggressor row buffer coupled to the next aggressor row circuitry a row to which the greatest number of row activation commands have been directed;

updating a current aggressor row buffer coupled to the next aggressor row buffer with the next aggressor row stored in the next aggressor row buffer based on detection of a refresh command by the refresh command detecting circuitry directed to the bank;

resetting a next aggressor count buffer coupled to the next-aggressor circuitry, following updating the current aggressor row buffer, the next aggressor count buffer storing a count of the number of row activation commands directed to the next aggressor row;

identifying by victim lookup circuitry one or more victim rows physically proximate to the current aggressor row and for populating a victim queue;

determining by victim queue circuitry coupled to the victim lookup circuitry based on detection of a refresh command directed to the bank, whether a victim queue is empty; and refreshing a row in the victim queue with the victim queue circuitry based on detection of a refresh command directed to the bank and a determination the victim queue is not empty.

2. The method of claim 1, further comprising threshold determining circuitry coupled to the next aggressor row circuitry for:

determining an activation count threshold value based on a comparison of the number of row activation commands directed to the current aggressor row with at least one threshold value; and providing the activation count threshold value to a memory controller.

3. The method of claim 1, further comprising threshold determining circuitry coupled to the next aggressor row circuitry for:

determining an activation count threshold value based on a comparison of the number of row activation commands directed to the rows in the one or more banks with at least one threshold value; and providing the activation count threshold value to a memory controller.

4. The method of claim 1, further comprising threshold determining circuitry coupled to the next aggressor row circuitry for:

comparing, in response to a row activation command directed to a row, the number of row activation commands directed to the row with the number of row activation commands directed to the next aggressor row, wherein determining the next aggressor row comprises updating the next aggressor row with the row when the number of row activation commands directed to the row is greater than the number of row activation commands directed to the next aggressor row; and resetting, in response to the row activation command directed to the row, a count of the number of row activation commands directed to the current aggressor row when the current aggressor row was updated with the next aggressor row after a refresh command preceding the row activation command directed to the row.

5. The method of claim 4, further comprising wherein the threshold determining circuitry is further configured for:

determining a number of rows in each of a plurality of buckets, including, for each bucket, counting a number of rows having a number of row activation commands directed thereto greater than or equal to a corresponding bucket activation count threshold of the bucket, wherein each bucket has a corresponding bucket activation count threshold different from all other buckets and a corresponding bucket threshold different from all other buckets;

selecting from among a subset of the buckets having non-zero numbers of rows therein, one of the buckets having a greatest bucket activation count threshold;

providing an activation count threshold value to a memory controller based on the bucket threshold of a selected one of the buckets; and before resetting the count of the number of row activation commands directed to the current aggressor row, decrementing a row count of each bucket having the current aggressor row therein by the number of row activation commands directed to the current aggressor row.

6. A system for per-row hammer tracking in a DRAM device, comprising:

aggressor processing circuitry comprising:

an activation command (ACT) detecting circuitry to monitor or detect a number of row activation commands directed to each row of a bank of the DRAM device;

a next aggressor row circuitry to determine a next aggressor row based on the number of row activation commands;

a next aggressor row buffer coupled to the next aggressor row circuitry storing a row to which the greatest number of row activation commands have been directed;

a next aggressor row count buffer coupled to the next aggressor row buffer storing a number of activation commands directed to the row stored in the next aggressor row buffer;

mitigation processing circuitry comprising:

a current aggressor row buffer coupled to the next aggressor row buffer for storing a current aggressor row that is the row stored in the next aggressor row buffer;

a current aggressor count buffer coupled to the next aggressor row count buffer and storing the number of activation commands stored in the next aggressor count buffer;

refresh command detecting circuitry to detect a refresh command directed to the bank;

victim lookup circuitry coupled to the current aggressor row buffer to identify one or more victim rows physically proximate to the current aggressor row and for populating a victim queue;

victim queue circuitry coupled to the victim lookup circuitry and determining whether the victim queue is empty and configured to initiate refreshing a row in the victim queue based on detection of a refresh command directed to the bank and a determination the victim queue is not empty; and wherein the mitigation processing circuitry is further configured to update a current aggressor row with the next aggressor row based on detection by the refresh command detecting circuitry of a refresh command directed to the bank.

7. The system of claim 6, wherein the aggressor processing circuitry is comprises threshold determining circuitry coupled to the next aggressor row circuitry configured to:

determine an activation count threshold value based on a comparison of the number of row activation commands directed to the current aggressor row with at least one threshold value; and provide the activation count threshold value to a memory controller.

8. The system of claim 6, wherein the aggressor processing circuitry comprises threshold determining circuitry coupled to the next aggressor row circuitry configured to:

count a number of row activation commands directed to rows in one or more banks of the DRAM device;

determine an activation count threshold value based on a comparison of the number of row activation commands directed to the rows in the one or more banks with at least one threshold value; and provide the activation count threshold value to a memory controller.

9. The system of claim 6, wherein the aggressor processing circuitry comprises threshold determining circuitry coupled to the next aggressor row circuitry configured to:

compare, in response to a row activation command directed to a row, the number of row activation commands directed to the row with the number of row activation commands directed to the next aggressor row, wherein the aggressor processing circuitry being configured to determine the next aggressor row includes being configured to update the next aggressor row with the row when the number of row activation commands directed to the row is greater than the number of row activation commands directed to the next aggressor row; and reset, in response to the row activation command directed to the row, a count of the number of row activation commands directed to the current aggressor row when the current aggressor row was updated with the next aggressor row after a refresh command preceding the row activation command directed to the row.

10. The system of claim 9, wherein the aggressor processing circuitry comprises threshold determining circuitry coupled to the next aggressor row circuitry configured to:

determine a number of rows in each of a plurality of buckets, including, for each bucket, count a number of rows having a number of row activation commands directed thereto greater than or equal to a corresponding bucket activation count threshold of the bucket, wherein each bucket has a corresponding bucket activation count threshold different from all other buckets and a corresponding bucket threshold different from all other buckets;

select, from among a subset of the buckets having non-zero numbers of rows therein, one of the buckets having a greatest bucket activation count threshold;

provide an activation count threshold value to a memory controller based on the bucket threshold of a selected one of the buckets; and before the count of the number of row activation commands directed to the current aggressor row is reset, decrement a row count of each bucket having the current aggressor row therein by the number of row activation commands directed to the current aggressor row.

11. A dynamic random access memory (DRAM) device, comprising:

at least one data storage array comprising a plurality of rows;

refresh processing circuitry configured to direct refresh operations to the data storage array;

row hammering processing circuitry, comprising aggressor processing circuitry and mitigation processing circuitry;

wherein an activation command (ACT) detecting circuitry of the aggressor processing circuitry is configured to monitor or detect a number of row activation commands directed to each row of a bank of the DRAM device and a next aggressor row circuitry is configured to determine a next aggressor row based on the number of row activation commands;

a next aggressor row buffer is coupled to the next aggressor row circuitry and stores a row to which the greatest number of row activation commands have been directed;

a next aggressor row count buffer is coupled to the next aggressor row buffer storing a number of activation commands directed to the row stored in the next aggressor row buffer;

wherein the mitigation processing circuitry comprises:

a current aggressor row buffer storing the next aggressor row based on detection of a refresh command directed to the bank;

a current aggressor count buffer coupled to the next aggressor row count buffer and storing the number of activation commands stored in the next aggressor count buffer;

refresh command detecting circuitry to detect a refresh command directed to the bank;

victim lookup circuitry coupled to the current aggressor row buffer to identify one or more victim rows physically proximate to the current aggressor row and for populating a victim queue;

victim queue circuitry coupled to the victim lookup circuitry and determining whether the victim queue is empty and configured to initiate refreshing a row in the victim queue based on detection of a refresh command directed to the bank and a determination the victim queue is not empty; and wherein the aggressor processing circuitry is further configured to reset the next aggressor row count buffer, following the updating of the current aggressor row, the next aggressor row count buffer's count of the number of row activation commands directed to the next aggressor row.

12. The DRAM device of claim 11, wherein the aggressor processing circuitry further comprises threshold determining circuitry coupled to the next aggressor row circuitry and configured to:

determine an activation count threshold value based on a comparison of the number of row activation commands directed to the current aggressor row with at least one threshold value; and provide the activation count threshold value to a memory controller.

13. The DRAM device of claim 11, wherein the aggressor processing circuitry further comprises threshold determining circuitry coupled to the next aggressor row circuitry and configured to:

determine an activation count threshold value based on a comparison of the number of row activation commands directed to the rows in the one or more banks with at least one threshold value; and provide the activation count threshold value to a memory controller.

14. The DRAM device of claim 11, wherein the aggressor processing circuitry further comprises threshold determining circuitry coupled to the next aggressor row circuitry and configured to:

compare, in response to a row activation command directed to a row, the number of row activation commands directed to the row with the number of row activation commands directed to the next aggressor row, wherein the aggressor processing circuitry being configured to determine the next aggressor row includes being configured to update the next aggressor row with the row when the number of row activation commands directed to the row is greater than the number of row activation commands directed to the next aggressor row; and reset, in response to the row activation command directed to the row, a count of the number of row activation commands directed to the current aggressor row when the current aggressor row was updated with the next aggressor row after a refresh command preceding the row activation command directed to the row.

* * * * *